United States Patent [19]

van der Lely et al.

[11] 4,121,774

[45] Oct. 24, 1978

[54] SPREADING IMPLEMENTS

[76] Inventors: Ary van der Lely, 10, Weverskade, Maasland; Cornelis J. G. Bom, 36, Esdoorniaan, Rozenburg, both of Netherlands

[21] Appl. No.: 670,440

[22] Filed: Mar. 25, 1976

[30] Foreign Application Priority Data

Mar. 26, 1975 [NL] Netherlands .................. 7503609

[51] Int. Cl.² .................................... A01C 15/00
[52] U.S. Cl. ................................ 239/664; 198/313; 198/632; 198/688; 198/844; 239/673
[58] Field of Search ........ 239/650, 655, 661, 663–666, 239/670, 672–676, 679, 681–684, 687, 159, 161, 163, 166, 167, 170, 172, 176; 214/518–522; 198/311, 313, 317, 318, 532, 538, 541, 544, 547, 564, 566, 638, 642, 688, 698, 699, 821, 837, 840, 843, 844, 847, 846, 860, 861, 780, 632; 296/100

[56] References Cited

U.S. PATENT DOCUMENTS

| 416,663 | 12/1889 | Blasdel ............................... 198/821 |
|---|---|---|
| 806,103 | 12/1905 | Burchardt ........................... 198/688 |
| 2,416,898 | 3/1947 | Breeze ................................ 239/661 |
| 2,782,943 | 2/1957 | Jones et al. ...................... 239/313 X |
| 2,863,669 | 12/1958 | Allersma ............................ 239/664 |
| 3,039,595 | 6/1962 | Lucas ................................. 198/564 |
| 3,292,773 | 12/1966 | Keehart et al. ................. 198/861 X |
| 3,400,805 | 9/1968 | Thompson ...................... 198/547 X |
| 3,568,937 | 3/1971 | Grataloup ......................... 239/655 |
| 3,633,796 | 1/1972 | Zweegers ....................... 239/664 X |
| 3,756,382 | 9/1973 | Adey, Jr. et al. .............. 198/846 X |
| 3,841,697 | 10/1974 | McFarland ........................ 296/100 |

FOREIGN PATENT DOCUMENTS

| 1,580,066 | 8/1969 | France ................................. 198/844 |
|---|---|---|
| 1,207,690 | 12/1965 | Fed. Rep. of Germany ........... 239/664 |
| 710,455 | 6/1954 | United Kingdom .................... 198/780 |

*Primary Examiner*—John J. Love
*Assistant Examiner*—Andres Kashnikow
*Attorney, Agent, or Firm*—Mason, Mason & Albright

[57] ABSTRACT

A spreader implement attachable to the rear of a tractor has a container with two side by side funnel shaped sections. A port in the bottom of each section allows material to pass to conveyor belts that extend laterally to each hopper side. A flow control member is slideably positioned below each port with one or more openings that correspond to each belt, which openings can be more or less exposed by an adjusting device. The conveyor belts are supported on a foldable boom at each lateral side of the container and each belt leads to a respective rotating spreading disc and the belts extend for different distances so that material is spread over a very broad path. Each spreading boom includes beams and supporting guides for the upper and lower runs of the belts. Guide members are positioned below the flow members to direct material to the upper conveyor runs. Each boom is interconnected to the implement frame via its supporting beams and is pivotable about a vertical axis when a spring-loaded latch is tripped and also about a horizontal axis. Each boom has inner and outer portions of about equal lengths which are pivoted to one another by a substantially vertical shaft. A supplemental chain support interconnects the top of the container with the boom adjacent the shaft so that each boom can be folded about the shaft and pivoted to a rear trailing position relative to the frame for transport with the chain still providing support. An outer portion of each boom has a sliding ground support and marker.

79 Claims, 23 Drawing Figures

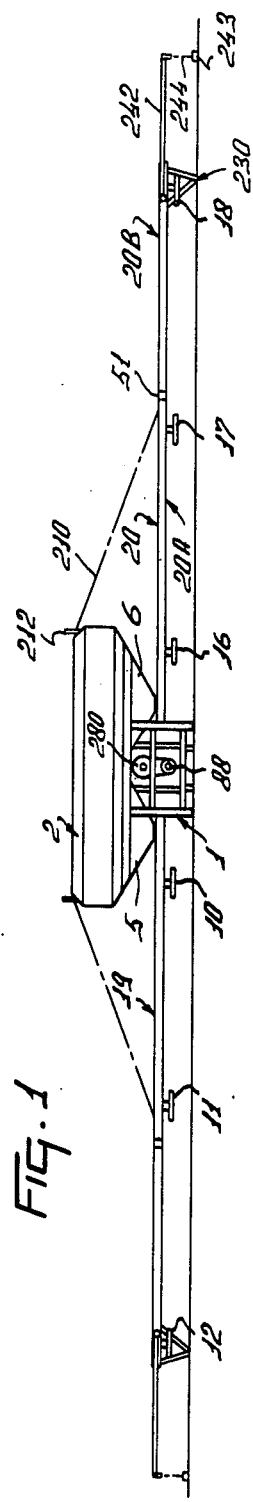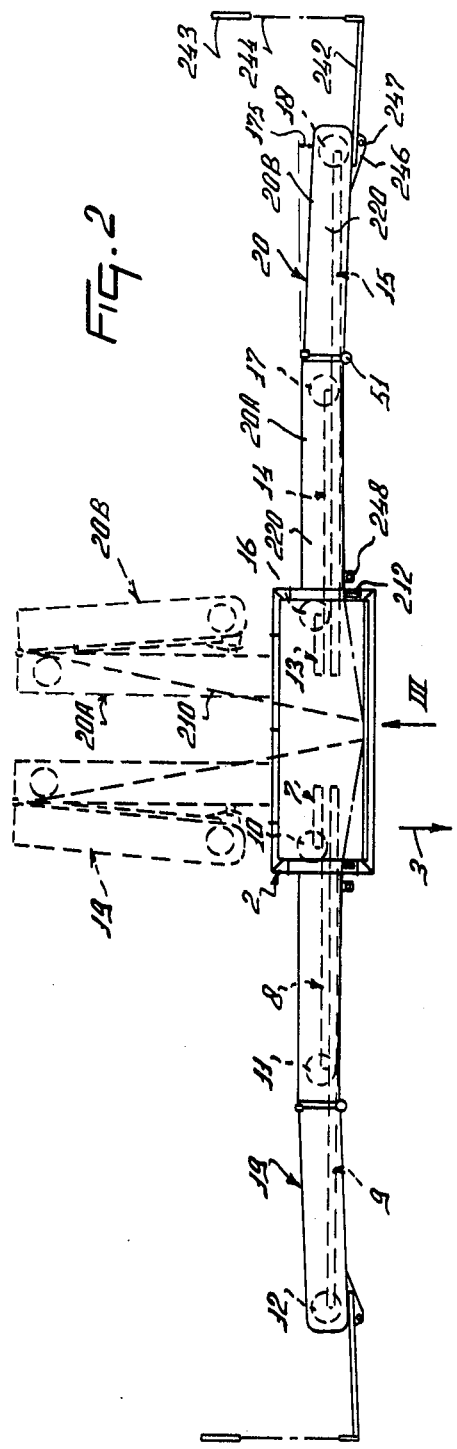

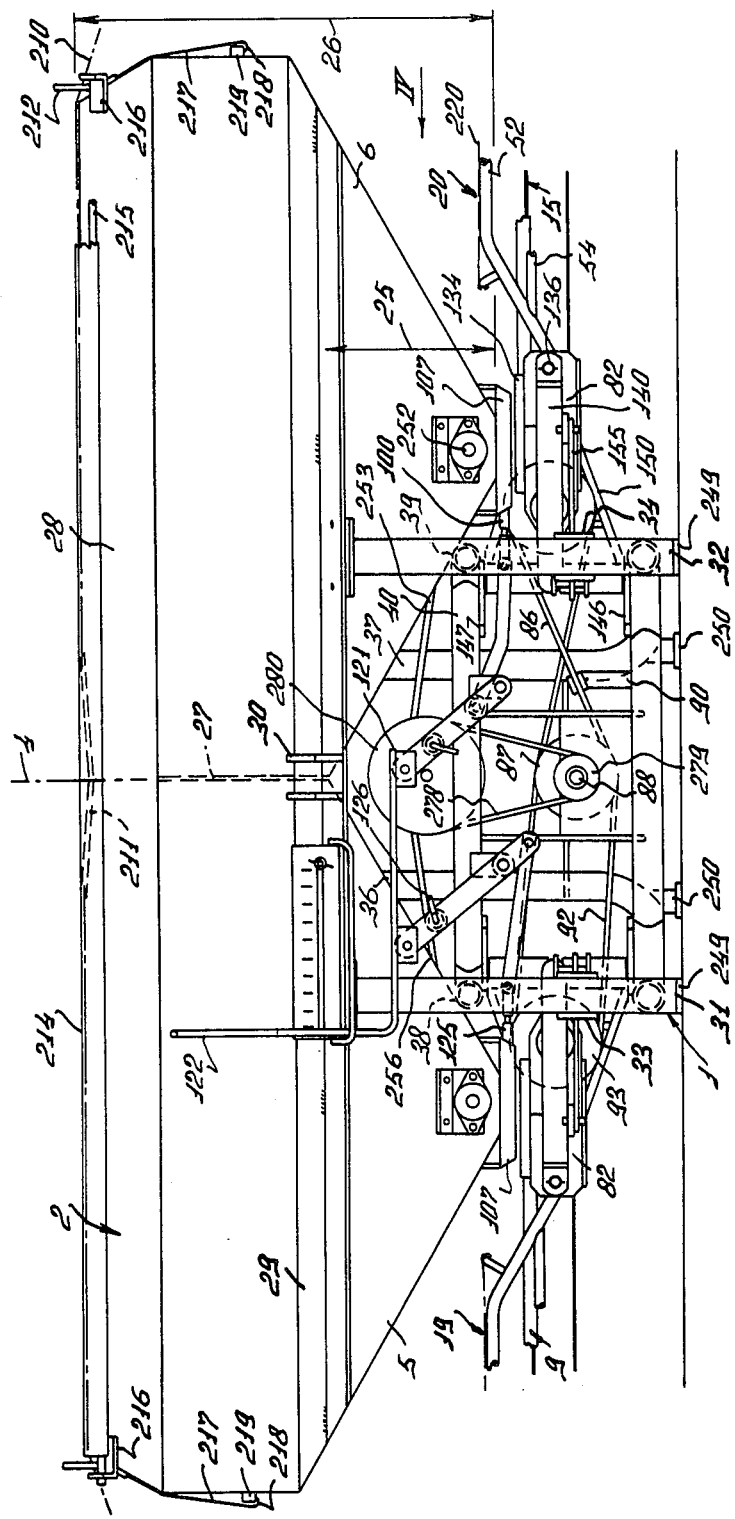

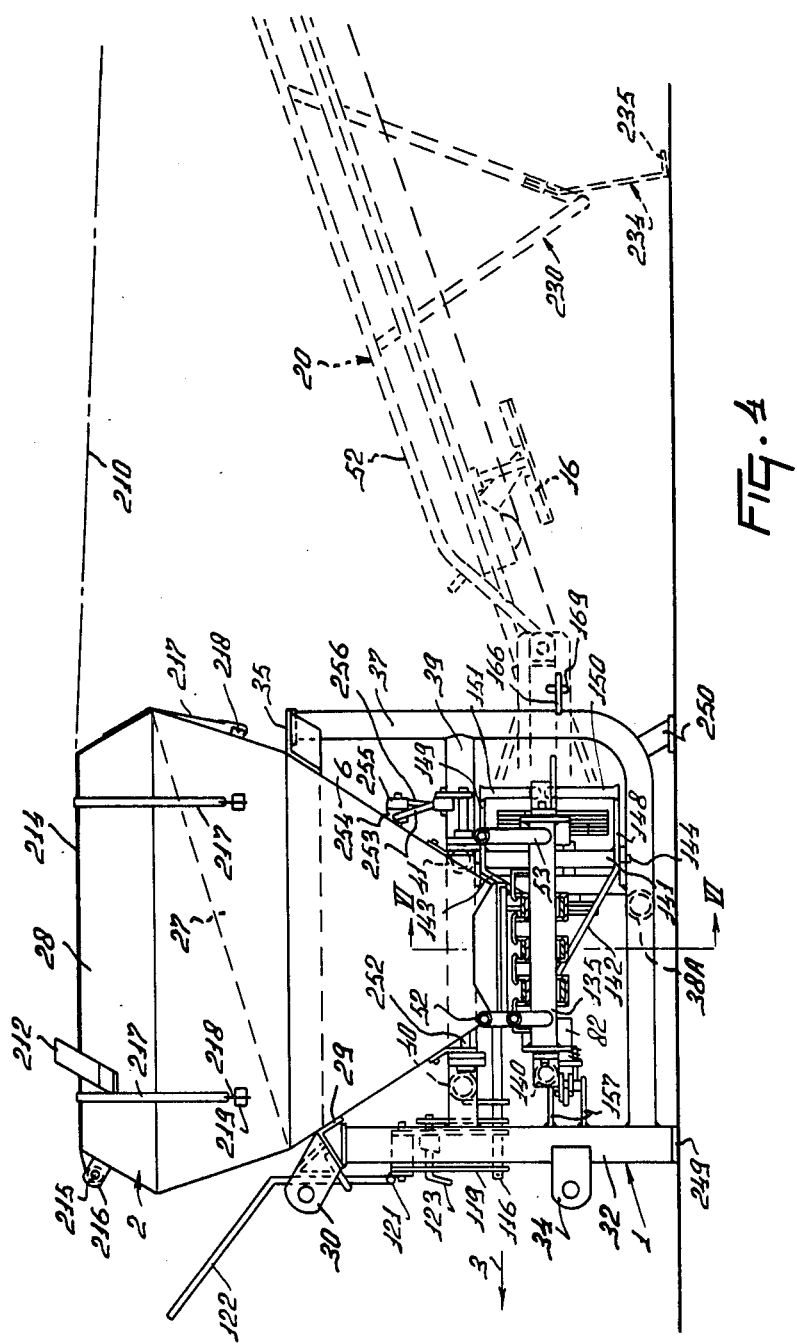

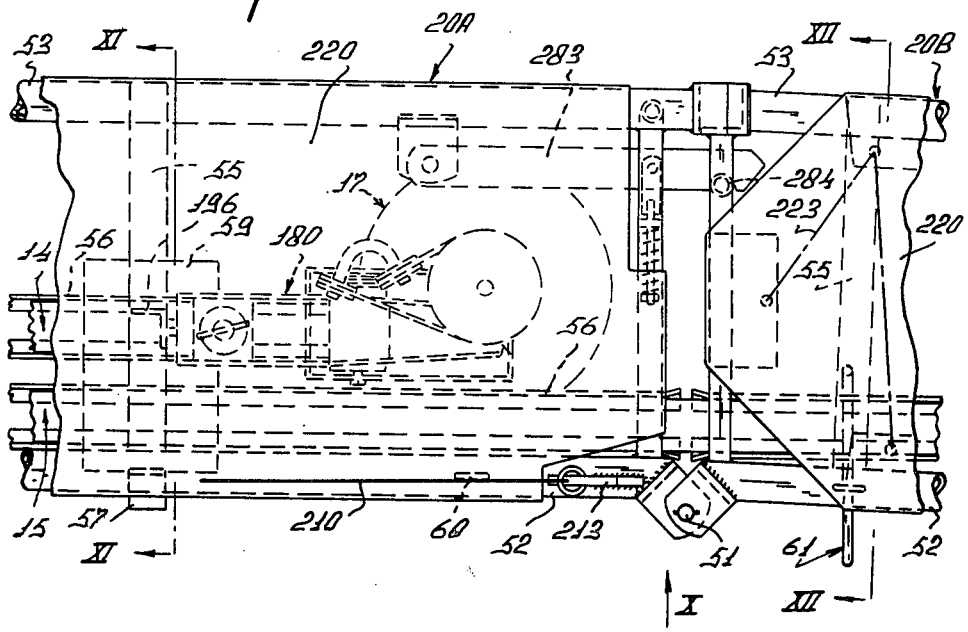
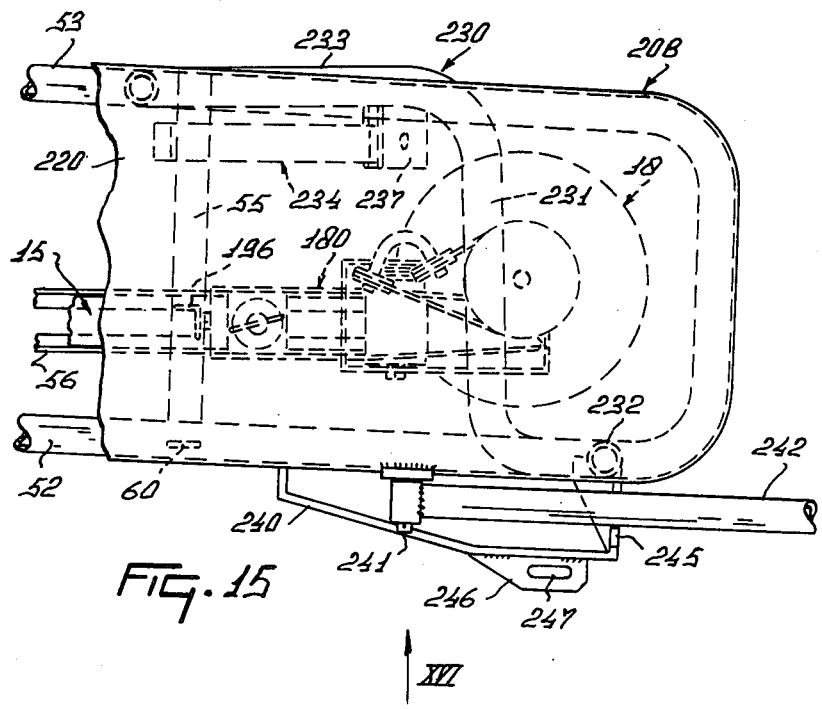

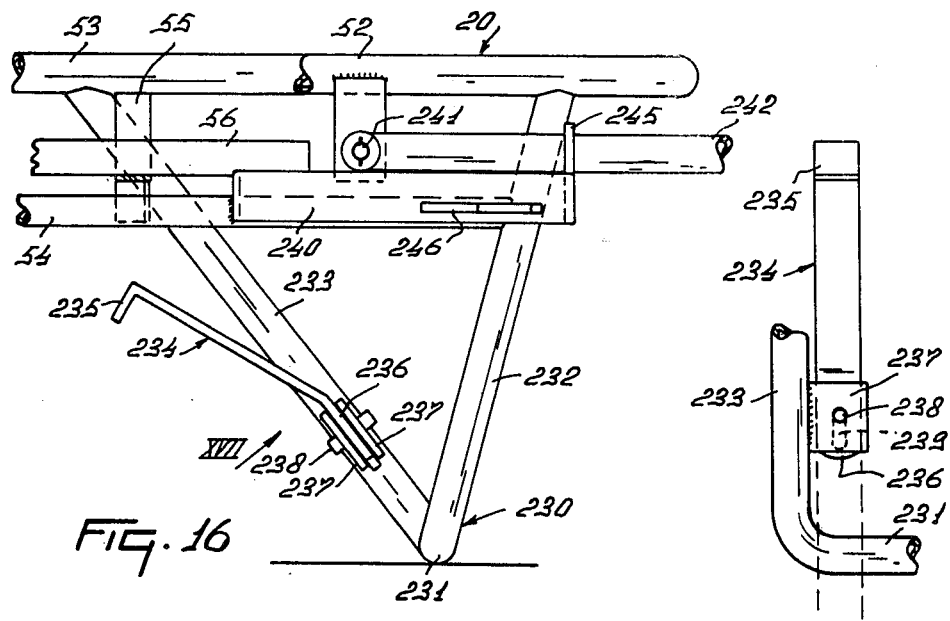
Fig. 16
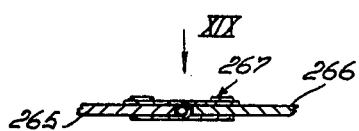
Fig. 17
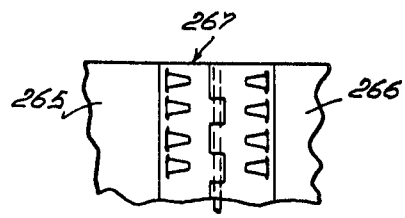
Fig. 18
Fig. 19
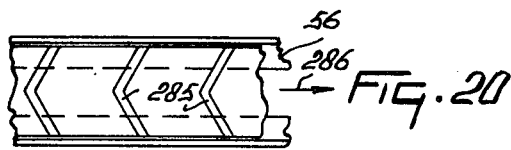
Fig. 20
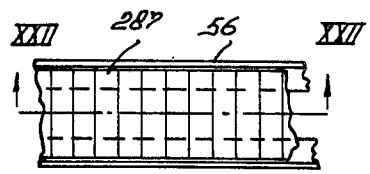
Fig. 21
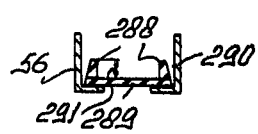
Fig. 23
Fig. 22

SPREADING IMPLEMENTS

SUMMARY OF THE INVENTION

According to the invention, there is provided a spreading implement of the kind set forth, wherein a spreading member that is rotatable about a substantially vertical axis is disposed at or near the end of the conveying member which is remote from the container, said spreading member being so arranged that, when viewed in a direction parallel to its axis of rotation, its center is disposed to one side of the longitudinal axis or center line of the conveying member, and wherein at least one guide member is arranged above the region of the conveying member that is in material-receiving relationship with said outlet port to direct material from that port towards the conveying member during the use of the implement.

For a better understanding of the invention, and to show how the same may be carried into effect, reference will now be made, by way of example, to the accompanying drawings, in which:

BRIEF DESCRIPTION OF THE DRAWINGS

FIG. 1 is a front elevation of a spreading implement in accordance with the invention, FIG. 2 is a plan view of the implement of FIG. 1, FIG. 3 is a front elevation, to an enlarged scale, of a central region of the implement of FIGS. 1 and 2 as seen in the direction indicated by an arrow III in FIG. 2, FIG. 4 is a side elevation as seen in the direction indicated by an arrow IV in FIG. 3, FIG. 9 is a plan view illustrating the pivotal mounting of one spreading boom of the implement, FIG. 15 is a plan view of the outer end of the spreading boom in FIG. 9, FIG. 16 is an elevation as seen in the direction indicated by an arrow XVI in FIG. 15, FIG. 17 is a view as seen in the direction indicated by an arrow XVII in FIG. 16, FIG. 18 is a section illustrating the junction between the opposite ends of a conveyor belt that forms part of the implement, FIG. 19 is a view as seen in the direction indicated by an arrow XIX in FIG. 18, FIG. 20 is a plan view illustrating one alternative form of conveyor belt that may be employed, FIG. 21 is a plan view illustrating another alternative form of conveyor belt that may be employed, FIG. 22 is a section taken on the line XXII—XXII in FIG. 21, and FIG. 23 is a cross-section of a further alternative form of conveyor belt that may be employed taken in a direction perpendicular to the length of the upper run of that belt, other associated supporting parts also being illustrated.

DESCRIPTION OF THE PREFERRED EMBODIMENTS

Figure 5:
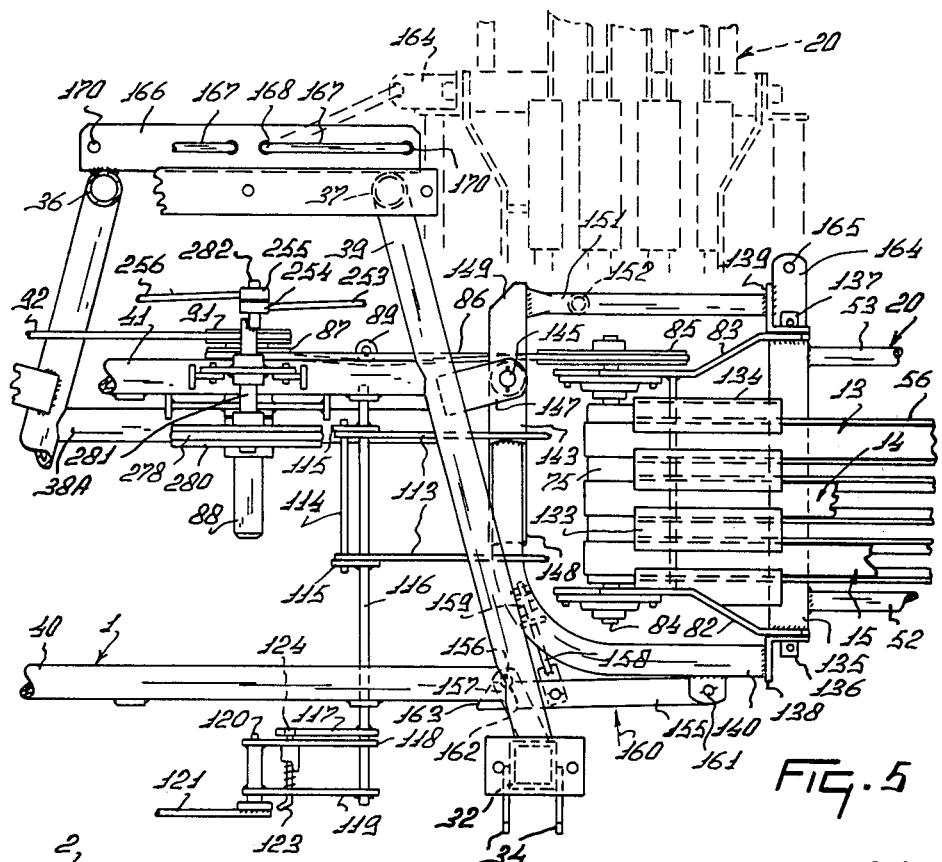
FIG. 5 is a plan view, to an enlarged scale, showing some parts that are located generally beneath a hopper of the implement, that hopper being omitted in FIG. 5.

Referring to the accompanying drawings, the spreading implement or device that is illustrated has a frame that is generally indicated by the reference numeral 1 and a container in the form of a hopper 2 that is mounted on the frame 1. The hopper 2 is of oblong configuration when seen in plan view (FIG. 2), the longer sides of the oblong being disposed perpendicular to the intended direction of operative travel of the implement that is indicated in FIGS. 2 and 4 of the drawings by an arrow 3. Both the frame 1 and the hopper 2 are symmetrically disposed with respect to an imaginary vertical plane of substantial symmetry 4 (FIG. 3) of the implement that extends parallel to the direction indicated by the arrow 3. The hopper has two outlet funnels 5 and 6 that are located at opposite sides of the plane 4, the implement comprising, at the side of said plane 4 at which the funnel 5 is disposed, three conveying members 7, 8 and 9. The three members 7, 8 and 9 extend perpendicularly, or substantially perpendicularly, with respect to the plane 4 to locations that are spaced at different distances from that plane, the locations coinciding with outer or delivery ends of the members 7, 8 and 9 and being associated with three corresponding spreading members 10, 11 and 12 in a manner that will be described subsequently in greater detail. Three conveying members 13, 14 and 15 are arranged at the side of the plane 4 at which the outlet funnel 6 is disposed, said members 13, 14 and 15 being associated with corresponding spreading members 16, 17 and 18 in a substantially symmetrically identical manner to the arrangement at the opposite side of the plane 4. The conveying members 7, 8 and 9 and the corresponding spreading members 10, 11 and 12 are all carried by a spreading boom 19 that is disposed at one side of the plane 4 and the conveying members 13, 14 and 15, together with the corresponding spreading members 16, 17 and 18, are all carried by a further spreading boom 20 that is mounted in a symmetrically identical manner at the opposite side of the plane 4. Each of the two outlet funnels 5 and 6 has a height 25 (FIG. 3) that is substantially two-fifths of the overall height 26 of the hopper 2. The hopper 2 is provided, midway across its width, with a partition 27 the general plane of which is substantially coincident with the plane of substantial symmetry 4, said partition 27 dividing the interior of the hopper 2 into two equal compartments each of which exhibits a corresponding one of the two outlet funnels 5 and 6. It can be seen from FIGS. 1 to 4 of the drawings that an upper rim of the hopper 2 is bent over inwardly to a small extent around all four sides of the upper edge of that hopper 2.

The front of the hopper 2 with respect to the direction 3 is provided, at substantially the level of the tops of the funnels 5 and 6, with a horizontally disposed beam 29 of right-angled cross-section (see particularly FIG. 4). The beam 29 serves a stiffening function for the hopper 2 and is provided, midway along its transverse length, with a pair of spaced and apertured lugs 30 that project upwardly and forwardly therefrom with respect to the direction 3. The frame 1 includes, at its front, two vertical beams 31 and 32 that are spaced at equal distances from opposite sides of the plane 4, said beams 31 and 32 being provided with corresponding pairs of apertured lugs 33 and 34 that project forwardly therefrom with respect to the direction 3. The rear of the hopper 2 with respect to the same direction is provided with a horizontally disposed beam 35 of obtuse angled cross-section (see FIG. 4), said beam 35 extending throughout the width of the rear of the hopper 2. The upper ends of vertical portions of connecting frame beams 36 and 37 are secured to the lower surface of a horizontal limb of the beam 35, the connecting frame beams 36 and 37 being of L-shaped configuration as seen in side elevation (FIG. 4), and having the leading ends of their lower substantially horizontally disposed limbs rigidly secured to the vertical beams 31 and 32 respectively at short distances above the lowermost ends of those beams 31 and 32. Horizontal beams 38 and 39 extend substantially parallel to the direction 3 and interconnect the beam 31 and the vertical portion of the connecting beam 38, and the beam 32 and the vertical portion of the connecting beam 39, respectively, said beams 38 and 39 being located at a horizontal level just above that of the midpoints of the beams 31 and 32. The horizontal beams 38 and 39 are interconnected by further horizontal beams 40 and 41 that both extend perpendicular to the direction 3 at locations which will be evident from an inspection of FIG. 4, in particular, of the drawings.

Figure 10:
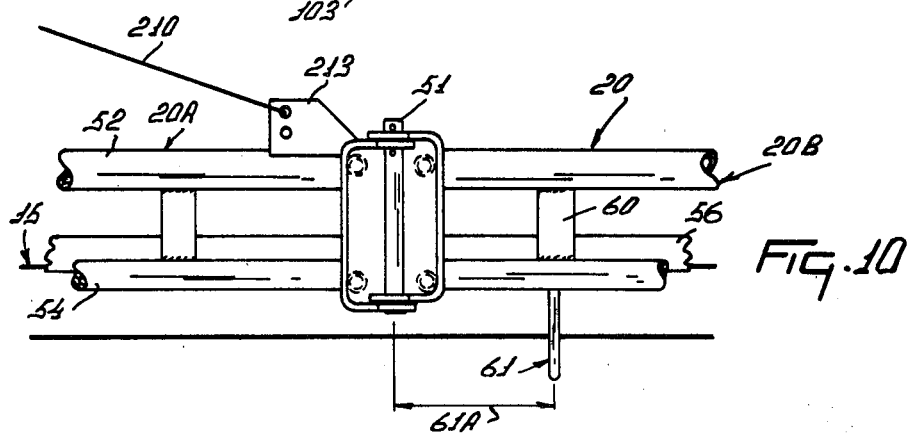
FIG. 10 is an elevation as seen in the direction indicated by an arrow X in FIG. 9.
Figure 11:
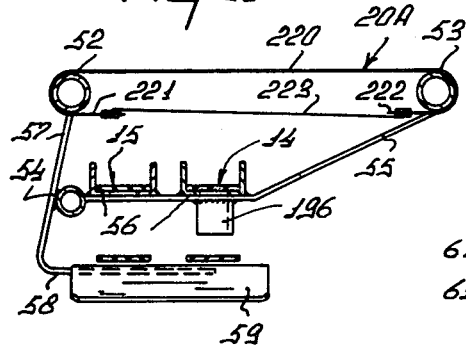
FIG. 11 is a section taken on the line XI—XI in FIG. 9.
Figure 12:
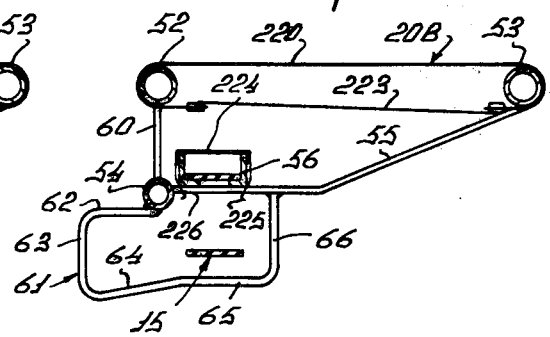
FIG. 12 is a section taken on the line XII—XII in FIG. 9.

The two spreading booms 19 and 20 are of symmetrically identical construction and it is therefore only necessary to describe the construction of one of them in detail. Accordingly, only the construction of the spreading boom 20 is illustrated in detail in the drawings and will now be described. The boom 20 comprises an inner portion 20A and an outer portion 20B, those portions being pivotable relative to one another about the axis of a substantially vertical shaft 51 (FIGS. 1, 2, 9 and 10). The boom 20 has a supporting frame which is afforded principally by two beams 52 and 53 that are of hollow formation and circular cross-section, the two beams 52 and 53 being located at the same level but a further beam 54 of the supporting frame being located at a lower level beneath the beam 52 (see FIGS. 10, 11 and 12). The beam 54 is also of hollow construction and of circular cross-section but its diameter is less than that of the two beams 52 and 53. The beam 53 and the beam 54 are interconnected, at intervals along the spreading boom 20, by strips 55 which support channnel-shaped guides 56 for the upper runs of appropriate, depending upon the position of each strip 55 to be considered, ones of three conveyor belts that principally afford the conveying members 13, 14 and 15. In the inner portion 20A of the spreading boom 20, the beams 52 and 54 are interconnected by a strip 57 that projects beneath the lower beam 54 and is there bent over to form a horizontal strip portion 58 which carries a supporting plate 59 over which the lower or return runs of the two belts that afford the conveying members 14 and 15 can slide. The plate 59 thus affords a belt support, its leading and rear edges with respect to the direction of movement of the belts thereover being bent over downwardly. In the outer portion 20B of the spreading boom 20, further strips 55 are provided that are very similar to the strips 55 in the inner portion 20A but the return run of the conveyor belt that affords the single remaining conveying member 15 is supported in an alternative manner. As can be seen in FIGS. 10 and 12 of the drawings, a closed, or substantially closed supporting bracket 61 that affords this belt support is spaced at a short distance 61A from the shaft 51 that pivotally interconnects the inner and outer portions 20A and 20B. The beams 52 and 54 are interconnected, in register with the bracket 61, by a strip 60 and further similar strips 60 interconnect the beams 52 and 54 at other points. A first horizontal portion 62 of the supporting bracket 61 extends forwardly away from the bottom of the beam 54 and is integrally connected by a 90° bend to the top of a second vertical portion 63. The lower end of the second vertical portion 63 is connected by a substantially 85° bend to a third portion 64 that is inclined upwardly from front to rear at an angle of substantially 5° to the horizontal. The rearmost of the third portion 64 is connected by a substantially 5° bend to a fourth horizontal portion 65 and the rear end of that portion, in turn, is connected by a substantially 90° bend to the lowermost end of a fifth substantially vertical portion 66 and the upper end of that portion is welded or otherwise rigidly secured to the lower surface of the registering strip 55. As can be seen in FIG. 12 of the drawings, the fourth substantially horizontal portion 65 of the supporting bracket 61 is located beneath the lower or return run of the belt that affords the conveying member 15 in vertical register with that run.

Figure 7:
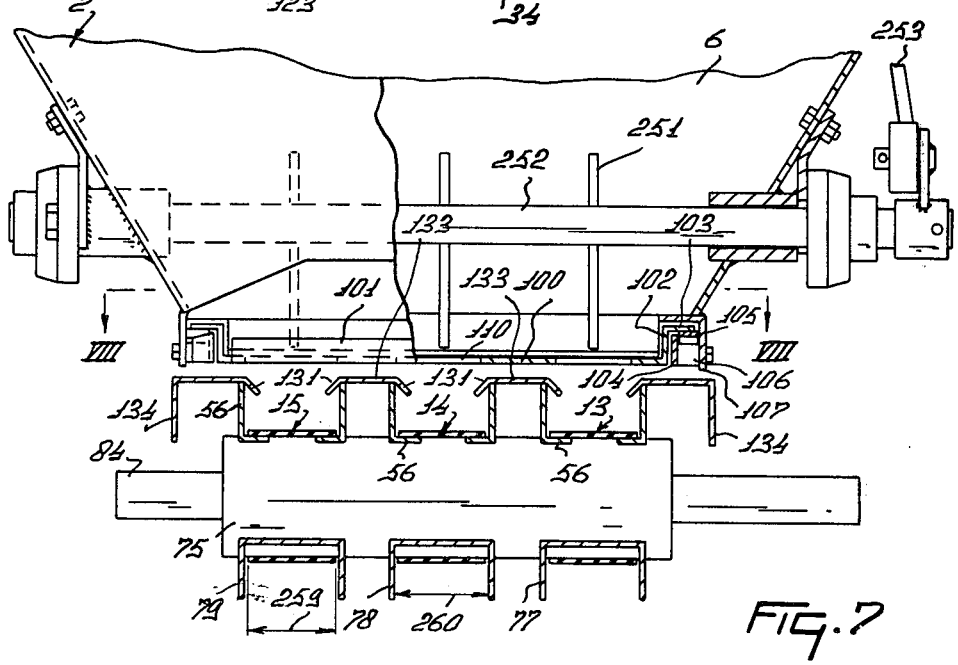
FIG. 7 is a section taken on the line VII—VII in FIG. 6.
Figure 6:
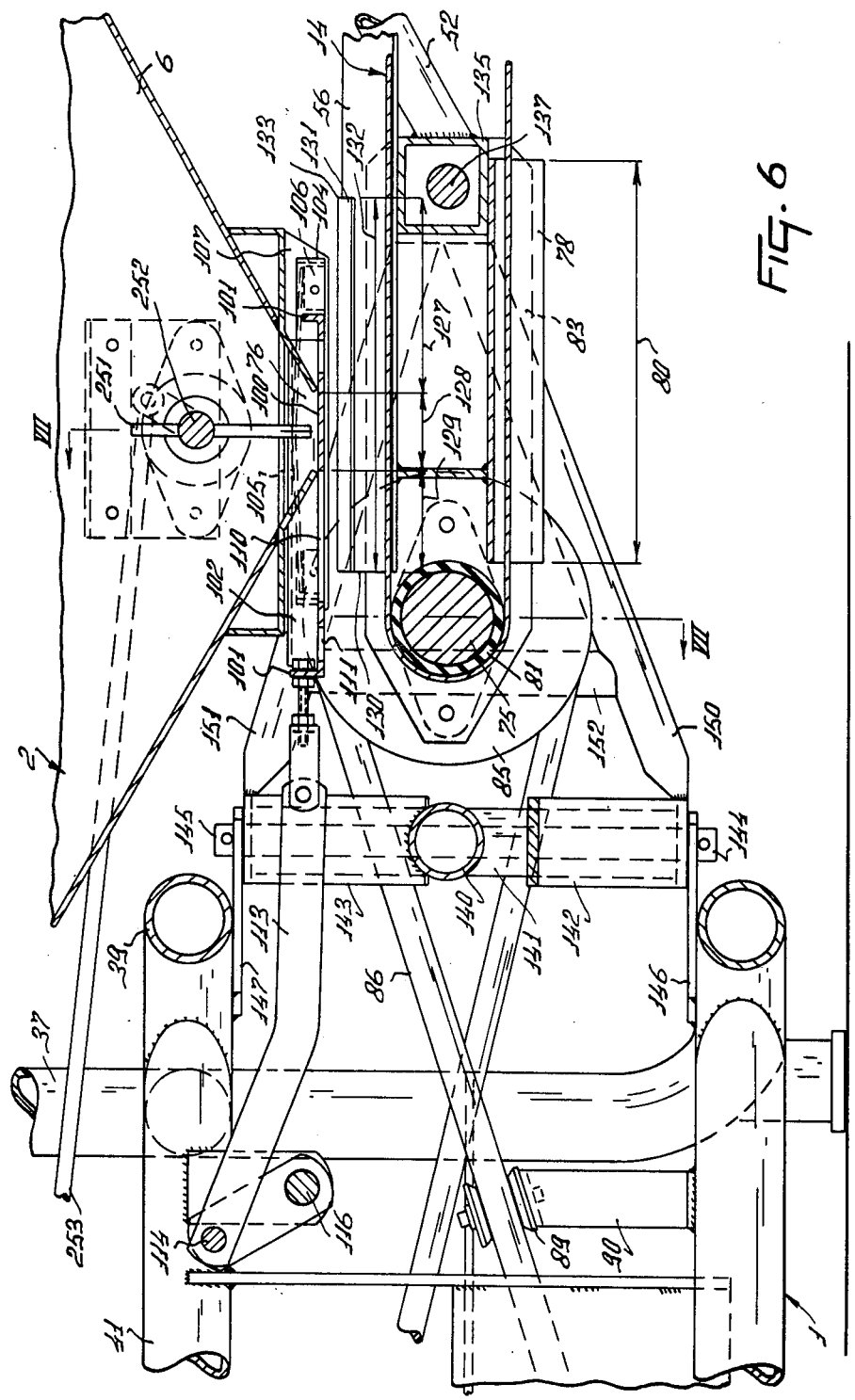
FIG. 6 is a section, to an enlarged scale, taken on the line VI—VI in FIG. 4.

The three belts that principally afford the conveying members 13, 14 and 15 are all passed around a cylindrical driving roller 75 (FIGS. 5 and 6) which is disposed a short distance towards the plane 4 from beneath the bottom of the outlet funnel 6 of the hopper 2, that hopper being omitted in FIG. 5 of the drawings. With this arrangement, inner ends of the upper runs of the belts of the corresponding conveying members 13, 14, and 15 are located immediately beneath an outlet port 76 formed at the bottom of the funnel 6. The lower return runs of the belts of the three conveying members 13, 14 and 15 are guided, in the region of the driving roller 75, by the downwardly extending limbs of three guides 77, 78 and 79 (FIG. 7) that are each of inverted channel-shaped cross-section. In fact, each of the three guides 77, 78 and 79 extends lengthwise along the corresponding belt run throughout a distance 80 (FIG. 6) which distance, in the implement that is being described, preferably has a magnitude of substantially 22 centimeters. In order to ensure that the conveyor belts will be satisfactorily gripped and driven by the roller 75, the outer surface of that roller is provided with a cylindrical layer 81 of resilient material with a radial thickness which is conveniently of the order of substantially 4 centimeters. The driving roller 75 is mounted on a substantially horizontal shaft 84 that is rotatably supported, near its opposite ends, by arms 82 and 83 that are rigid with the spreading boom 20. The end of the shaft 84 that is located close to the arm 83 carries a pulley 85 which is in driven connection with a smaller pulley 87 mounted on a main driving shaft 88 by way of a transmission belt 86 or the like of circular cross-section. The driving shaft 88 is a rotary input shaft of the implement and is intended to be placed in driven connection with the power take-off shaft of an agricultural tractor or other operating vehicle through the intermediary of a telescopic transmission shaft (not shown) which is of a construction that is known per se having universal joints at its opposite ends. The belt 86 is crossed between the pulleys 85 and 87 (see FIG. 3) to ensure that, during operation, said pulleys will rotate in opposite directions, and so as to avoid rubbing wear as far as possible, one of the crossing runs of the belt 86 is engaged by a deflecting jockey pulley 89 mounted in a freely rotatable manner on an axle pin carried by a support 90 (FIG. 6). In addition to the pulley 87, the driving shaft 88 carries a further similar pulley 91 (FIG. 5) which, during operation, transmits drive to a pulley 93 (FIG. 3) by way of a belt 92 or the like of circular cross-section. The pulley 93 is associated with the spreading boom 19 and has a symmetrically identical arrangement and function to the pulley 85. However, it will be noted from FIG. 3 of the drawings that the belt 92 is not crossed between the pulleys 91 and 93 so that, when the implement is in operation, those two pulleys will rotate in the same directions.

A flow control member 100 is provided immediately beneath the outlet port 76 of the hopper funnel 6, said flow control member 100 being basically in the form of a rectangular plate that is provided along two opposite edges with upright rims 101 and along the other two opposite edges with upright rims 102. The upper edges of the rims 102 are provided with outwardly projecting horizontal supporting strips 103. The upright rims 102 lie between guides 104, said guides 104 being secured to blocks 106 which blocks, in turn, are secured to lugs 107 that depend from the outlet funnel 6 near to the outlet port 76. The clearance between the guides 104 and the upright rims 102 is such that the flow control member 100 is movable in a direction 112 (FIG. 8), and in the opposite direction, said direction 112 being parallel to the lengths of the guides 104. The strips 103 co-operate with leaf springs 105 (FIGS. 6 and 7), said leaf springs being connected, with the guides 104, to the blocks 106. The leaf springs tend to retain the upper surface of the flow control member 100 in engagement with the rectangular mouth of the outlet port 76. The flow control member 100 has three generally isosceles triangular outlets 110 and six auxiliary circular outlets 111, the auxiliary outlets 111 being arranged so that three of them are located close to each of the two upright rims 101. It will also be noted from FIG. 8 of the drawings that, with this arrangement, two auxiliary outlets 111 are located in register, in a direction parallel to the direction 112, with the apex and the midpoint of the base of each substantially isosceles triangular outlet 110.

The upright rim 101 of the flow control member 100 that is located closest to the plane 4 is adjustably and pivotably connected by two spaced strip-shaped rods 113 to a shaft 114 (FIG. 6) that is carried by lugs 115 (FIG. 5). The lugs 115 are rigidly secured to a shaft 116 that extends substantially parallel to the direction 3 and which is provided, near its leading end, with a coupling arm 117. Coupling arm 117 is rigidly secured to the shaft 116 and extends alongside a strip 118 which, together with a further spaced but parallel strip 119, is freely turnably mounted on the shaft 116. The strips 118 and 119 are located at the front of the implement and together afford a pivotable arm having an end that is remote from the shaft 116 is connected by a horizontal pivot pin 120 to a horizontal portion 121 of a control arm 122 (FIG. 3). A spring-loaded horizontal locking pin 123 is carried by the two strips 118 and 119 in such a way that its tip can be entered into, or be maintained withdrawn from, a hole 124 that is formed near the end of the coupling arm 117 that is remote from the shaft 116. It will be evident that insertion of the locking pin 123 into the hole 124 effectively renders the pivotable arm that is afforded by the strips 118 and 119 rigid with the shaft 116 whereas, when the locking pin 123 is ineffective, the pivotable arm is turnable relative to the shaft 116 and to the coupling arm 117. A flow control member 125 that is symmetrically identical to the flow control member 100 is provided beneath an outlet port of the hopper funnel 5 and is indirectly connected to the horizontal portion 121 of the control arm 122 in a manner that is basically identical to the indirect connection of the member 100 to said arm that has just been described with particular reference to FIGS. 3, 5 and 6 of the drawings, the connection in question being illustrated in outline in FIG. 3 of the drawings and including a horizontal locking pin 126, the function of which is the same as that of the locking pin 123. Thus, either or both of the flow control members 100 and 125 can be indirectly connected to the control arm 122. The rod and pivot connections between the flow control members 100 and 125 and the control arm 122 are so dimensioned that, when both the locking pins 123 and 126 are engaged, a displacement of the control arm 122 will cause equal displacements of the two members 100 and 125 in opposite directions.

The channel-shaped guides 56 for the upper runs of the conveyor belts of the conveying members 13, 14 and 15 all have upright rims or walls throughout their lengths, said rims or walls all being of the same height. In the region of the hopper funnel 6, the guides 56 all extend into close proximity to the driving roller 75 and, away from ends 130 of the guides 56 that are located very close to the roller 75, the tops of said guides 56 are provided, throughout a distance 132, with additional guide members 131. The additional guide members 131 (FIGS. 6 and 7) comprise strips that project downwardly from the upper edges of the rims of each guide 56 in convergent relationship and, thus, three downwardly convergent elongated funnel-shaped slots are formed beneath the three outlets 110 of the flow control member 100 to direct material from the hopper 2 onto central regions of the widths of the three conveyor belts when a spreading operation is in progress. The downwardly convergent strips that afford the additional guide members 131 are, in fact, located at the edges of closure plates 133 located in the two gaps between the three guides 56 and at the edges of outer rim plates 134. The ends of the two outer rim plates 134 are secured to a supporting beam 135 together with the beams 52, 53 and 54 of the inner portion 20A of the spreading boom 20 and the inner ends of the inverted channel-shaped guides 77, 78 and 79. The arms 82 and 83 between which the roller 75 is rotatably mounted are also fastened to the beam 135 and it will be seen in FIG. 5 of the drawings that the opposite ends of said beam 135 are provided with horizontally aligned pins 136 and 137, those pins being turnably mounted in holes in limbs of corresponding right-angled brackets 138 and 139 respectively. The non-apertured limb of the bracket 138 is fastened to one end of one limb of an L-shaped arm 140, said arm 140 being secured, in turn, to the top of a vertical supporting beam 141 (FIG. 6). Struts 142 and 143 (FIGS. 4 and 6) are provided to strengthen the junction between the arm 140 and the supporting beam 141.

The upper and lower ends of the beam 141 carry vertically aligned pivot pins 144 and 145 that are turnably journalled in apertures in corresponding strong lugs 146 and 147, said lugs 146 and 147 being horizontally disposed and secured to the connecting frame beam 37 and to the beam 39, respectively. The struts 142 and 143 are strip-shaped and extend horizontally beyond the supporting beam 141 to form lugs 148 and 149 to which the ends of corresponding oblique supporting beams 150 and 151 are fastened. The beams 150 and 151 extend towards one another and, at their junction, they are both fastened to the right-angled bracket 139. The supporting beams 150 and 151 are interconnected quite near to the lugs 148 and 149 by a tubular frame beam 152. The L-shaped arm 140 carries a pivotally mounted latch 155 that is arranged to co-operate retainingly with a pin 156 that extends between two lugs 157 (FIG. 4) carried by the vertical beam 32. As can be seen best in FIG. 5 of the drawings, the latch 155 is turnably connected to the arm 140 by a vertical pivot pin 161 and, at a location well spaced from that pin 161, one end of a rod 158 is pivotally connected to the latch. The rod 158 is loaded by a helical compression spring 159 in such a way as to tend to turn the latch 155 in the direction indicated by an arrow 160 in FIG. 5 of the drawings about the pivot pin 161, a more or less semi-circular recess 162 in one edge of the latch 155 thus being urged into retaining enagagement with the pin 156. The end of the latch 155 that is remote from the pivot pin 161 is formed as an inclined edge 163, the function of which is to co-operate with the pin 156 to overcome the spring 159 and restore the condition illustrated in full lines in FIG. 5 of the drawings after a displacement of the spreading boom 20 as will be further discussed below.

The right-angled bracket 139 carries a lug 164 near the free end of which a hole 165 is formed. A strip 166 (FIGS. 4 and 5) extends substantially horizontally between the connecting frame beams 36 and 37 at the back of the frame 1 and two latching arms 167 are carried thereby so as to be turnable about corresponding substantially vertical pivots 168 located approximately midway along the strip 166. Each latching arm 167 is movable upwardly and downwardly for a short distance by axial displacement of the corresponding pivot 168 and each of them is provided, at the end thereof remote from the corresponding pivot 168, with a downwardly directed hooking end 169 (FIG. 4). When the latching arms 167 are ineffective as is illustrated in full lines in FIG. 5, the hooking ends 169 thereof are entered in corresponding holes 170 formed close to the opposite ends of the strip 166. When the spreading boom 20 is turned rearwardly about the axis defined by the vertical pivot pins 144 and 145 into the position illustrated in broken lines in FIG. 5, the hooking end 169 of the corresponding latching arm 167 is engaged in the hole 165 in the lug 164 to maintain that position.

The three beams 52, 53 and 54 extend parallel to one another in the inner portion 20A of the spreading boom 20 and there is a similar arrangement in the outer portion 20B thereof. However, it will be noted that the longitudinal axis of the outer portion 20B is inclined to that of the inner portion 20A by a small angle 175 (FIG. 2) so that the outer portion 20B is directed forwardly to a very small extent with respect to the direction 3. The angle 175 preferably has a magnitude of substantially 5°. The spreading member 18 (FIGS. 1, 2, 13 and 15) which is located substantially at the outermost end of the boom 20 co-operates with the belt that affords the conveying member 15 and is located substantially midway between the beams 52 and 53 (see FIG. 15). Each of the three spreading members 16, 17 and 18 is adjustably connected to the end of the corresponding guide 56 that is remote from the plane 4 by a corresponding supporting member 180. The supporting members 180 are all similar and FIGS. 13 and 14 of the drawings illustrate the construction and arrangement of the member 180 by which the spreading member 18 is adjustably connected to the outer end of the guide 56 associated with the conveying member 15. The supporting member 180 includes a bracket 181, said bracket 181 carrying a substantially vertical bearing 182 for a shaft 183 to which the lower end of the spreading member 18 is fastened, said shaft 183 thus affording the axis of rotation of the spreading member 18. The upper end of the shaft 183 is provided, above the bearing 182, with a pulley and a transmission belt 185 or the like which is of circular cross-section places such pulley in driven connection with a further pulley mounted at the end of a cylindrical roller 184 around which the conveyor belt of the conveying member 15 is guided through 180°. During operation, movement of the conveyor belt rotates the cylindrical roller 184 and such rotation is transmitted by belt 185 from the further pulley at the end of said roller to the pulley at the upper end of the shaft 183 and thus the spreading member 18. An upright support carried by the bracket 181 has a bent axle rod 186 fastened to its upper end and it will be seen from FIGS. 13 and 14, in particular, of the drawings that the opposite ends of said axle rod 186 are provided, in a freely rotatable manner, with two small guide pulleys that co-operate with the belt 185 to guide the two runs thereof through corresponding substantially 90° curves. The bracket 181 is secured to the lower edges of a member 187 that is of channel-shaped cross-section, the web or base 188 of said member 187 being in engagement, from beneath, with the bottom of the associated guide 56. The member 187 has upright limbs 189 and 190 which lie alongside the relatively remote surfaces of the rims or walls of the guide 56, the upper edges of said limbs 189 and 190 being perpendicularly interconnected by a substantially horizontal strip 191. The strip 191 is formed centrally with a screw-threaded hole which receives the matchingly screw-threaded shank of a clamping bolt 192. The lower end of the shank of the bolt 192 co-operates with a strip or plate 193 which is fitted between the limbs 189 and 190 of the member 187 so as to bear downwardly against the upper edges of the rims of the channel-shaped guide 56. A lug 194 projects downwardly from the web or base 188 of the member 187 and is formed with a central hole against which a nut is welded so that the screw-threaded bore of the nut is in register with said central hole. The shank of a bolt 195 is screwed through the nut and the hole in the lug 194, the top of the head of the bolt 195 bearing against an abutment 196 which depends from the lower surface of the bottom of the guide 56. It will be seen from FIG. 14 of the drawings that the shank of the bolt 195 extends from the lug 194 towards the bracket 181 and that said lug 194 is also directly connected, appropriately by a tubular member, to the bracket 181 as well as via the web or base 188 of the member 187.

Figure 13:
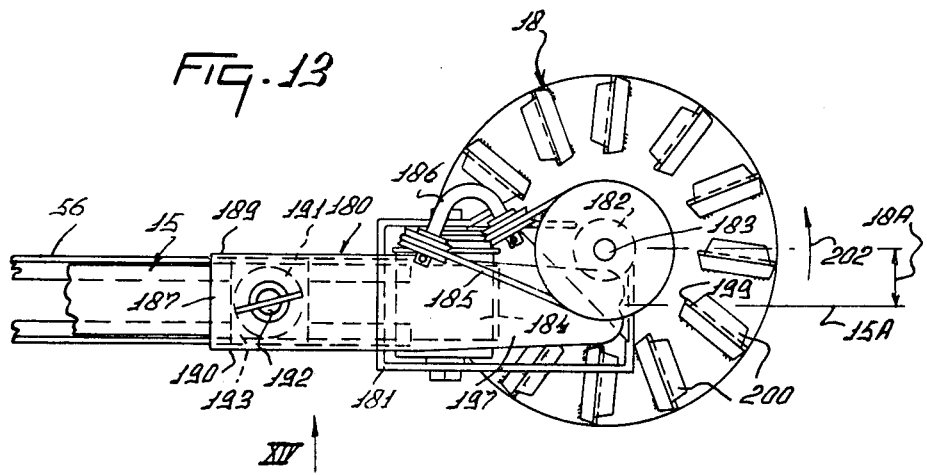
FIG. 13 is an elevation, to the same scale as FIG. 9, showing the construction and arrangement of one spreading member of the implement.

A hood-shaped or cap-shaped guide member 197 extends from between the upright limbs 189 and 190 of the member 187 towards the center of the spreading member 18, its lowermost notched end 198 being located alongside the shaft 183 between that shaft and the radially inner ends 199 of twelve spreading blades 200 that are disposed on the upper surface of a generally horizontal circular disc of the spreading member 18 at regular 30° intervals around the axis of the shaft 183. In fact, said disc is formed with a central upwardly tapering frusto-conical portion 201 and it will be seen from FIG. 13 of the drawings that the lowermost end 198 of the guide member 197 opens partly in vertical register with said portion 201 as well as partly in register with a flat region of the disc that immediately surrounds the base of said portion 201. As seen in plan view (FIG. 13), the hood-shaped or cap-shaped guide member 197 is disposed symmetrically at opposite sides of the longitudinal axis or center line 15A of the upper run of the belt of the conveying member 15. The longitudinal axis of the shaft 183 which affords the axis of rotation of the spreading member 18 is spaced rearwardly, with respect to the direction 3, from said axis or line 15A, as seen in FIG. 13, by a distance 18A. Each spreading blade 200 extends outwardly towards the outer circular edge of the disc of the spreading member 18 in such a way that, considered radially from the shaft 183, the inner end thereof is a little more advanced in the intended direction of rotation 202 (FIG. 13) of the spreading member 18 than is the outer end thereof. The blades 200 may thus be considered as being trailing or swept back to a small extent from their inner to their outer ends with respect to the direction 202.

In addition to the connection of each spreading boom 19 and 20 to the frame 1 by way of the corresponding supporting beam 141, chains 210 are also provided for sustaining purposes. Each chain 210 extends from a corresponding anchorage lug 211 (FIG. 3) across the top of the hopper 2 and, in the position thereof that is shown in irregularly broken lines in FIGS. 1 and 2 of the drawings, behind a corresponding stop 212 and thence to a corresponding strip 213 (FIGS. 9 and 10) on top of the beam 52 of the corresponding inner boom portion at a point very close to the corresponding pivotal shaft 51. The chains 210 are diagrammatically illustrated as single lines in the drawings and it is noted that, in fact, they may be replaced by other flexible but inextensible members such, for example, as cables. The portions of the chains 210 that extend across the top of the hopper 2 are located beneath a sheet or tarpaulin 214 that normally covers the open top of the hopper 2. One edge of the sheet of tarpaulin 214 is engaged around a shaft 215 that extends horizontally throughout the length of the upper leading edge of the hopper 2, the opposite ends of said shaft 215 being journalled in apertures in lugs 216 that are fastened to the hopper 2. In order to keep the sheet of tarpaulin 214 reliably in place, its side and rear edges are provided with elastic stretchers 217 the free ends of which carry hooks 218. When the stretchers 217 are elastically lengthened, the hooks 218 will engage eyes 219 mounted on the side and rear walls of the hopper 2 in the manner which can be seen best in FIG. 4 of the drawings.

Covers 220 (FIGS. 11 and 12) are provided above the conveying members where those members extend along the booms 19 and 20. The covers 220 may be formed from, for example, canvas or from some other textile material that is preferably impregnated with a synthetic plastics material. It will be seen from FIGS. 11 and 12 that each cover 220 passes over and around the corresponding beams 52 and 53 and has lower edge regions 221 and 222 that are directed towards one another. The lower edge regions 221 and 222 of the covers are flexibly interconnected, below the beams 52 and 53, by wire springs or the like 223, the arrangement of one wire spring or the like being seen at the right-hand side of FIG. 9 of the drawings as well as in FIGS. 11 and 12. Only the conveying member 15 is of sufficient length to extend into the outer portion 20B of the spreading boom 20. The guide 56 that corresponds to the conveying member 15 is shielded in the part thereof that extends into the outer portion 20B by a cover 224 (FIG. 12), said cover 224 being maintained in engagement with the guide 56 by spring clips 225 which have tops that engage over the cover 224 and downwardly projecting limbs with lower ends 226 which are lodged underneath the guide. The cover 224, like the covers 220, may be formed from canvas or from canvas or other textile material suitably impregnated with a synthetic plastics material.

As is illustrated in detail only for the spreading boom 20, the outer end of the outer portion of each spreading boom is provided with a corresponding sliding ground support 230. The illustrated sliding ground support 230 comprises a horizontal portion 231 (FIG. 16) that extends substantially parallel to the direction 3 when the implement is in operation, the opposite ends of said portion 231 being integral with, or rigidly secured to, oppositely inclined obliquely upwardly extending end portions 232 and 233 respectively. The upper extremities of the end portions 232 and 233 are rigidly secured to the beams 52 and 53, respectively, of the supporting frame of the outer portion 20B of the spreading boom 20. Thus, as viewed in front elevation (FIG. 16), the sliding support 230 is substantially V-shaped. The end portion 233 carries a re-tractable supporting leg 234 that is formed with a foot 235. The leg 234 is strip-shaped and the end 236 thereof that is remote from the foot 235 is sandwiched between two lugs 237 (FIGS. 16 and 17) that are fastened to the end portion 233 in parallel and closely spaced relationship. A pin 238 extends perpendicularly through aligned holes in the two lugs 237 and through a slot 239 formed in the intervening end 236 of the leg 234. The extremity of the leg end 236 is rounded beyond the slot 239 as can be seen in the drawings. Moreover, a bracket 240 and a pivot pin 241 are fixedly mounted in the outer portion 20 B of the boom 20 in the region of the sliding support 230. An arm 242 is turnably connected to the boom 20 by the pivot pin 241 and a ground marker 243 (FIGS. 1 and 2) is flexibly connected to the free end of the arm 242 by a length of chain 244 or the like. A supporting lug 245 projects upwardly from the outer end of the bracket 240 and supportingly cradles the arm 242 when the latter is in the position thereof that is illustrated in FIGS. 15 and 16. A substantially horizontal lug 246 projects forwardly from the bracket 240 with respect to the direction 3 and is formed with a slot 247 (FIG. 15). The slotted lug 246 is provided for co-operation with a pair of vertically spaced substantially horizontal lugs 248 that can be seen in plan view in FIG. 2 of the drawings. When the machine is not in use, its frame 1 can rest upon the ground surface in a stable position employing foot plates 249 at the lower ends of the vertical beams 31 and 32 and rear feet 250 that are carried by the connecting frame beams 36 and 37.

When the implement is to be used in a spreading operation, it is connected to the three-point lifting device or hitch of an agricultural tractor or other operating vehicle employing the lugs 30 to establish a pivotal connection with the upper adjustable lifting link of that device or hitch and the lugs 33 and 34 to establish connections with the free ends of the lower lifting links. The implement is particularly suitable for the distribution over agricultural land of powdered and granular materials such, for example, as granular artificial fertilizers, seeds and the like. The material that is to be spread is loaded into the hopper 2 in any convenient manner and, during the speading operation, it is transported by the conveying members to the spreading members which distribute it substantially uniformly over the ground surface. The sheet of tarpaulin 214 is, of course, removed from the top of the hopper for filing purposes and a spreading operation may be carried out with, or without, said sheet 214 in its operative position in dependence upon factors such as the nature of the material that is to be spead and the prevailing weather conditions, particularly the wind strength. The spreading booms 19 and 20 occupy substantially the positions thereof that are illustrated in full lines in FIG. 2 of the drawings when the implement is in use and the material to be spread is fed through the flow control members 100 and 125 from the outlet funnels 5 and 6 respectively to the conveying members 13 to 15 and 7 to 9 respectively. The volume of material per unit time which is spread, and thus per unit area of land traversed, assuming a substantially constant speed of operative travel, is dependent upon the degree of register of the outlets 110 in the member 100 with the corresponding port 76. A symmetrically identical arrangement exists in respect of the flow control member 125 and it is, therefore, only necessary to describe the arrangement for the flow control member 100 in detail. Clearly, if the outlets 110 are in complete register with the port 76, the volume of material per unit time which can flow therethrough will be at a maximum that will be progressively reduced by bringing said outlets 110 farther out of register with the port 76 until the flow of material is completely stopped when a condition of no register between the outlets 110 and the port 76 is reached. The displacement of the flow control member 100 is effected by manipulation of the control arm 122 which, as can be seen in FIG. 3 of the drawings, is movable along a scale. An adjustable stop is provided and can be set, with the aid of a wing nut, at any chosen point along the scale that corresponds to a desired rate of distribution of a particular material. Once the stop has been set, it is only necessary to move the arm 122 along the scale into abutting contact therewith to ensure that the desired rate of distribution of the material within the hopper 2 will be brought about.

Figure 8:
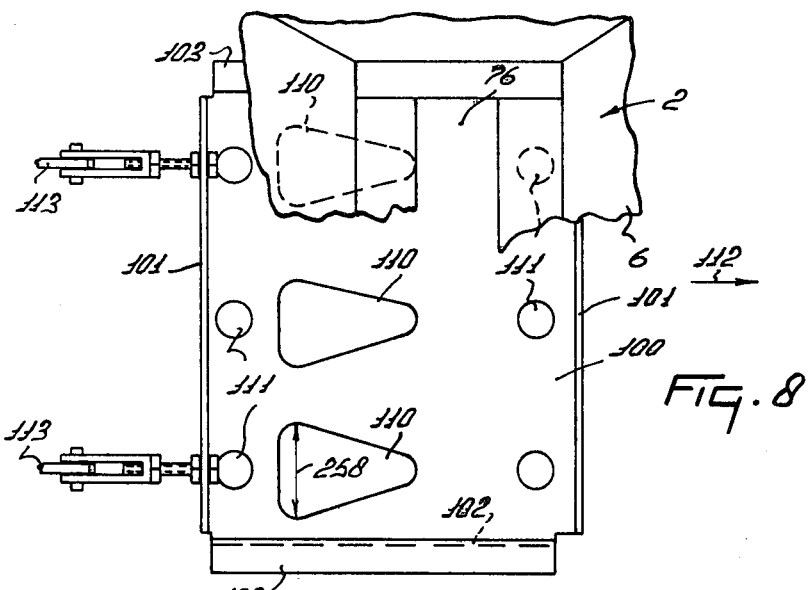
FIG. 8 is a plan view as seen in the direction indicated by arrows VIII—VIII in FIG. 7.

In the position illustrated in FIG. 3 of the drawings, the control arm 122 is at the lower end of the co-operating scale so that the outlets 110 are fully out of register with the port 76 and no material is delivered from the funnel 6. This condition is also illustrated in FIG. 8 of the drawings. The non-apertured region of the flow control member that closingly co-operates with the edges of the port 76 is maintained in effective sealing engagement therewith by the leaf springs 105 that urge the member 100 upwardly into contact with the funnel 6. Despite the fact that a good seal between the upper surface of the flow control member 100 and the edges of the port 76 is maintained by the springs 105, there will inevitably be a little leakage of the material onto the upper surface, particularly when a finely powdered material is to be spread and, in order to avoid a build up of such incorrectly placed material, the auxiliary outlets 111 allow that material to fall downwardly onto the underlying conveying members 13 and 14 and 15. It will, of course, be realized that there will be some vibration during the operation of the machine and that this alone will be sufficient to ensure that most of the material that leaks onto the upper surface of the member 100 will sooner or later fall through one of the auxiliary outlets 111. In order to minimize caking or bridging of material within the hopper 2, and to improve the uniformity of flow of that material to the conveying members 7,8,9,13,14 and 15 generally, each of the outlet funnels 5 and 6 is provided with a corresponding agitator. Reference to FIG. 6 of the drawings will show the construction and arrangement of an agitator 251 that is provided in the funnel 6. The agitator 251 comprises a central shaft 252 that extends substantially parallel to the direction 3, the shaft 252 being rockable about its own longitudinal axis in substantially horizontally aligned bearings carried by the front and rear walls of the funnel 6. The shaft 252 carries upwardly and downwardly directed stirring or agitating pins and the end thereof that projects beyond the rear one of said bearings carries a short arm that is pivotally linked to one end of a connecting rod 253. The opposite ends of the connecting rod 253 carries a ring 254 (FIGS. 4 and 5) and that ring is turnably mounted on an eccentric pin 282 together with an identical ring 255 which is located at the end of a connecting rod 256 for the similar agitator in the funnel 5.

When the outlets 110 are open, the agitated material from the funnel 6 falls through those outlets onto underlying regions of the belts of the three members 13, 14 and 15 that are disposed in the corresponding guides 56, it being noted that the maximum width 258 (FIG. 8) of each outlet 110 is substantially the same as the width 259 (FIG. 7) of each belt. It is preferred that the widths 258 and 259 should have a magnitude of substantially 5 centimeters. Some of the material that falls through the outlets 110 onto the belts of the members 13, 14 and 15 will usually first strike, and be deflected by, the strip-shaped and downwardly convergent additional guide members 131 so that most of the material actually falls onto the upper runs of the belts in central regions thereof with very little of it coming into contact with the rims of the guides 56. The additional guide members 131 extend from vertically beneath one edge of the outlet port 76 throughout a distance 129 (FIG. 6) towards the plane 4, said distance 129 being approximately equal in magnitude to the length 128 (FIG. 6) of each member 131 that is in vertical register with the outlet port 76. Each additional guide member 131 also extends in a direction away from the plane 4 throughout a distance 127 that is preferably not less than twice the length 128, said distance 127 being measured from a location vertically beneath the edge of the port 76 that is farthest from the plane 4. Each guide 56 has an internal width 260 (FIG. 7) that is slightly greater than the width 259 of each conveying member belt, it being preferred that the width 260 should exceed the width 259 by substantially 2 millimeters and it being desirable that the additional width of the interior of each guide 56 should not be greater than the width 259 by more than substantially 4 millimeters. The clearance is sufficient to allow the belts of the conveying members 13, 14 and 15 to move easily through the guides 56 and it has been found that very little, if any, granular material finds its way between the edges of the upper runs of the belts and the upright rims or walls of the guides 56. Any momentarily trapped granular material tends to escape back onto the upper surface of the belt concerned and, thus, the frictional drag which the guides 56 exert on the belts is quite low. Little if any material adheres to the rims of the guides 56 or gets beneath the belts onto the apertured floors of the guides.

The material that is received from the funnel 6 of the hopper 2 onto the belts of the conveying members 13, 14 and 15 is, during operation transported along the spreading boom 20 towards the corresponding spreading members 16, 17 and 18. The material is supplied to those spreading members by the corresponding hood-shaped or cap-shaped guide members 197 and the material thus reaches substantially the correct locations on the rotating discs of the guide members for effective distribution. This is important inasmuch as accurate supply of the material to the correct location on the disc of each spreading member ensures a very uniform distribution therefrom so that the material is spread in a very uniform manner throughout all, or most, of the working width of the implement. The spreading members 16, 17 and 18 and the corresponding guide members 197 are satisfactorily fastened in their appointed positions relative to the corresponding guides 56 by clamping the corresponding channel-shaped members 187 adjustably to the ends of the guides 56 concerned. It will be evident from FIGS. 13 and 14, in particular, of the drawings, that the clamping is effected by tightening the bolts 192 to urge the strips or plates 193 into engagement with the upper edges of the rims of the guides 56 concerned, it only being necessary to loosen any bolt 192 when an adjustment is required. The effectively fixed position of each member 187 relative to the corresponding guide 56 has a favorable effect upon the distribution of the corresponding stream of material because, consequently, the corresponding hood-shaped or cap-shaped guide member 197 and the axis of rotation of the corresponding spreading member 16, 17 or 18 also occupy effectively fixed positions relative to the remainder of the implement. Any adverse effect of steady or gusty wind upon the carriage of the material along the conveying members 13, 14 and 15 is minimized by the provision of the covers 220 on the top of the spreading boom 20 and, of course, similarly on the top of the spreading boom 19. The cover 224 (FIG. 12) that co-operates with the guide 56 for the conveyor belt of the member 15 in the outer portion 20B of the boom 20 serves the additional function of preventing the material on the belt in the corresponding guide 56 from being jerked out of that guide during the passage of the machine over uneven ground, the vibration caused by such passage being, of course, particularly noticeable in the longest guides 56 that correspond to the two outermost spreading members 12 and 18.

When the booms 19 and 20 are in the effective operative positions that are illustrated in full lines in FIG. 2 of the drawings, the chains 210 bear against the lugs 248 and are maintained in a taut condition across the top of the hopper 2. Thus, in the event of movement of the booms 19 and 20 relative to the frame 1, the chains 210 will not move significantly across the top of the hopper 2. When the sheet of tarpaulin 214 is in use, the chains 210 are disposed underneath the sheet on top of the hopper 2. The ground markers 243 indicate the margins of the path of operative travel of the implement during each traverse of the land that is to be spread with material, said markers being arranged to drag over the soil surface to produce readily visible lines. When the markers 243 are in their operative positions, the arms 242 occupy the positions thereof that are illustrated in FIGS. 2, 15 and 16 of the drawings.

Figure 14:
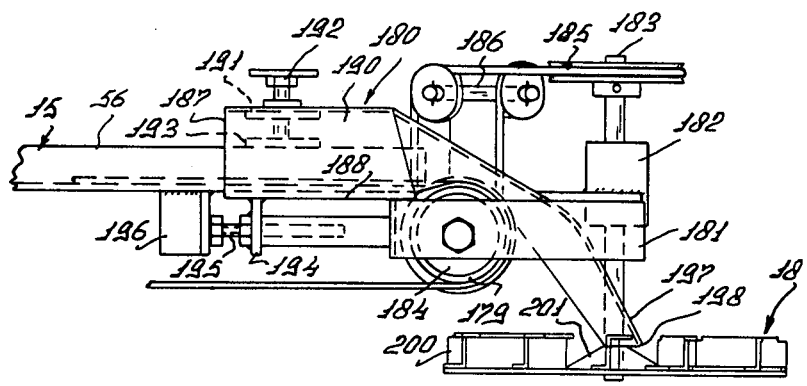
FIG. 14 is a view as seen in the direction indicated by an arrow XIV in FIG. 13.

The belts of the conveying members 7, 8, 9, 13, 14 and 15 are effectively driven by providing the outer surfaces of the corresponding rollers 75 with the layers 81 (FIG. 6) of resilient material. Each cylindrical layer 81 may be formed from, for example, foam rubber and prevents slip occurring between the roller 75 and the corresponding belt unless that belt is very slack indeed. Moreover, the provision of the layers 81 prevents material that is to be spread from being "baked" onto the curved surfaces of the rollers 75 by pressure and/or frictionally produced heat as can occur with rollers having curved surfaces which are plain. With the described and illustrated construction, any material that gets between the outer surface of one of the layers 81 and the inner surface of the corresponding belt is squeezed momentarily into the layer 81 but is then automatically expelled when the layer 81 becomes free of contact with the inner surface of the belt. If desired, the cylindrical rollers 184 that co-operate with the various belts at the ends of the upper runs thereof that are remote from the plane 4 may also be provided with cylindrical layers of resilient material such as foam rubber. Reference to FIG. 14 of the drawings shows the roller 184 that is visible in that Figure provided with an outer cylindrical layer 179 that is equivalent to one of the layers 81. If one of the conveying member belts should become so slack that it slips during operation, a satisfactory degree of tension therein can readily be re-established by loosening the clamping bolt 192 of the corresponding supporting member 180, screwing the head of the corresponding bolt 195 out of the nut carried by the corresponding lug 194 until the belt tension is correct and finally re-tightening the clamping bolt 192 concerned. For example, if the belt of the conveying member 15 should be too slack, the action that has just been described will increase the distance between the lug 194 and the abutment 196 as viewed in FIG. 14 of the drawings. Conversely, should the belt be too tight, the distance in question can readily be reduced after screwing the bolt 195 further into the nut carried by the lug 194.

The sliding ground supports 230 prevent the outer ends of the spreading booms 19 and 20 from striking the ground surface in an undesirable manner during travel of the implement over rough and/or undulating land. If, under such circumstances, the outer end of one of the spreading booms moves downwardly towards the ground surface, the horizontal portion 231 of the corresponding support 230 comes into contact with the ground surface and maintains the boom concerned spaced therefrom. The portions 231 have such a length in substantially the direction 3 that they will support the boom ends without penetrating significantly into the soil surface and will slide over that surface in the manner of shoes, skids or runners, it being important that said portions 231 should be in as nearly as possible strictly parallel relationship with the direction 3. Each of the two booms 19 and 20 can turn upwardly and downwardly relative to the frame 1 about the axis that is defined by the pins 136 and 137 in the case of the boom 20 and by a corresponding pair of pins in the case of the boom 19. The pivotal axis that is defined by the pins 136 and 137 is substantially coincident with the longitudinal axis of the corresponding beam 35 and is substantially horizontally parallel to the direction 3. Thus, should one of the sliding supports 230 be urged upwardly to a considerable extent by contact with the ground surface, the corresponding boom 19 or 20 can turn upwardly until the undulation has been passed when the weight of the boom will cause it to move downwardly again until the chain 210 concerned becomes taut. It will, of course, be realized that the three spreading members that correspond to each of the two booms 19 and 20 are turnable upwardly and downwardly with those booms and that there will be no interruption in the delivery of material to the spreading members during an upward deflecting movement of either boom.

The guides 77, 78 and 79 (FIGS. 6 and 7) ensure that the conveying member belts move satisfactorily around the rollers 75 that correspond to the two booms 19 and 20 and between the upright rims or walls of the corresponding channel-shaped guides 56. The movement of the belts along the guides 56 and the delivery of material therefrom to the spreading members is improved by joining the opposite ends of each belt to one another in a substantially uniplanar manner as is illustrated in FIGS. 18 and 19 of the drawings. Those Figures show that the opposite ends 265 and 266 of one of the belts are interconnected by a flat belt binder 267 that incorporates a hinge pin, the axis of which is substantially perpendicular to the length of the run of the belt in which said binder 267 is disposed.

The two runs of the transmission belt 86 are in crossed relationship, whereas those of the transmission belt 92 are not, to ensure that the upper runs of the belts of the conveying members 7, 8 and 9 shall move outwardly away from the plane 4, during the operation of the implement, in an opposite direction to that in which move the upper runs of the belts of the conveying members 13, 14 and 15. As previously mentioned, the jockey pulley 89 bears against one run of the transmission belt 86 so as to prevent, or very greatly minimize, rubbing contact at the point at which, as seen in elevation, the two runs of the belt 86 cross one another. The jockey roller 89 (FIG. 6) actually co-operates with the slack or return run of the belt 86. The pulleys 85, 87, 91 and 93 and the belts 86 and 92 are at the back of the implement with respect to the direction 3 at positions behind a transmission belt 278 which co-operates with a small pulley 279 on the shaft 88 and a large pulley 280 (see FIGS. 3 and 5). The large pulley 280 is located at the leading end of a rotary shaft 281, the rearmost end of which carries the eccentric pin 282. This arrangement of the pulleys 85, 87, 91 and 93 at the back of the implement, together with the transmission belts 86 and 92, renders those parts readily accessible from the rear of the implement for maintenance and adjustment purposes.

If, during either maneuvering or operative travel, the front of one or both of the spreading booms 19 and 20 should strike a more or less fixed obstacle, the boom concerned, or both booms, can yield rearwardly about the substantially vertical axis which is defined by the pins 144 and 145 for the boom 20 and/or about a similarly defined axis in respect of the boom 19. In the case of the boom 20, the retaining effect of the spring 159 must be overcome before that boom will yield rearwardly, said spring 159 acting to tend to retain the position illustrated in full lines in FIG. 5 of the drawings in which the recess 162 in the latch 155 is in engagement with the pin 156. When the retaining spring 159 has been overcome, the latch 155 becomes free of engagement with the pin 156 and the whole boom 20 can turn rearwardly about the axis defined by the pins 144 and 145 to avoid the obstacle and can, if necessary, reach as far as the position thereof that is illustrated in broken lines in FIG. 5. After a rearward displacement of the boom 20, it can be turned manually back about the axis defined by the pins 144 and 145 and the latched position illustrated in full lines in FIG. 5 is automatically re-established because, when the inclined edge 163 at the end of the latch 155 meets the pin 156, said pin causes the whole latch 155 to turn through a few degrees about the pivot pin 161, in a direction opposite to that indicated by the arrow 160 and against the action of the spring 159, until the pin 156 snaps back into the recess 162. If, during maneuvering of the implement, the outer portion 20B of the boom 20 should have its rear side strike a more or less fixed obstacle as can happen, for example, during the negotiation of a bend, said portion can turn forwardly relative to the inner portion 20A about the axis defined by the substantially vertical shaft 51. However, the turning moment that is exerted on the portion 20B must be sufficient to overcome the spring of a pivotally mounted spring-loaded latch 283 (FIG. 9), said latch co-operating with a pin 284 in much the same way as has already been described for the latch 155 that can be seen best in FIG. 5 of the drawings. Accordingly, it is not necessary to described the operation of the latch 283 and pin 284 in further detail.

FIG. 2 of the drawings illustrates, in broken lines, a position of the implement that is suitable for the inoperative transport and storage thereof, in which position both the substantially symmetrically identical booms 19 and 20 are folded. To reach this position from the operative position that is illustrated in full lines, the boom 20 is first turned rearwardly with respect to the direction 3 about the axis defined by the pivot pins 144 and 145 after the release of the latch 155. After said boom has been turned about that axis through substantially 90°, the lug 164 (FIG. 5) arrives in the position thereof that is shown in broken lines in the same Figure which is such that the hooking end 169 of the nearest latching arm 167 can be withdrawn from the hole 170 in the strip 166 and can be entered retainingly in the hole 165 in said lug 164. The latch 283 is disengaged from the pin 284 whereafter the outer portion 20B of the boom 20 can be turned through substantially 180° relative to the inner portion 20A about the axis defined by the corresponding substantially vertical shaft 51. As can be seen in FIG. 2 of the drawings, the outer portion 20B then extends alongside the inner portion 20A in very nearly parallel relationship with that portion and with the direction 3. The lug 246 is then entered between the corresponding pair of lugs 248 a spring-loaded locking pin that is not illustrated in the drawings being entered through the holes in the lugs 248 and through the slot 247 in the intervening lug 246. In the transport position of the implement, the arm 242 is turned through substantially 180° about the pin 241, together with the corresponding ground marker 243 and length of chain 244, until those parts extend alongside the portion 20B between that portion and the immediately neighboring inner portion 20A. Folding of the boom 20 into the transport position thereof that is illustrated in broken lines in FIG. 2 causes said boom to be turned upwardly to some extent about the substantially horizontal axis that is defined by the corresponding pins 136 and 137 because of the provision of the corresponding chain 210. The end of the chain 210 that is fastened to the hopper 2 is so disposed relative to the axis defined by the pins 144 and 145 that turning the boom 20 rearwardly about that axis tends marginally to increase the distance between the opposite ends of the chain 210 so that, since the chain 210 is inextensible, said boom must turn upwardly about the substantially horizontal axis defined by the pins 136 and 137. Substantially the disposition shown in broken lines in FIG. 4 of the drawings is thus reached in which position the chain 210, after sliding across the top of the hopper 2, extends fore and aft as shown in regularly broken lines in FIG. 2 and in irregularly broken lines in FIG. 4. In order that the implement shall then be able to stand in a stable position on the ground, the leg 234 that is carried by the outer portion 20B of the boom 20, but which is then disposed alongside the inner portion 20A, is turned downwardly into its operative position. The slotted end 236 of the leg 234 is moved lengthwise along the pin 238 until the arcuately curved extremity of that end can turn about the pin 238 between the lugs 237. The foot 235 will then co-operate supportingly with the ground surface and the leg 234 will not collapse because the contact of the foot 235 with said ground surface will cause the slotted end 236 of said leg to move along the pin 238 until the end of the slot 239 that is remote from the curved extremity of said end 236 is reached. The leg 234 cannot then turn about the pin 238 to any significant extent because of abutment against the end portion 233 of the sliding support 230. The implement can thus stand on the ground in a stable position with its frame 1 supported by the two foot plates 249 and the two rear feet 250, its boom 19 and 20 being supported by the corresponding more or less taut chains 210 and the feet 235 of the corresponding legs 234.

The dimensions of the implement that has been described by way of example are such that a strip of ground having a width of substantially 12 meters can be spread with material from the hopper 2 at each traverse of the implement. It is, however, possible to use only one of the two booms 19 and 20 for the distribution of material in which case the flow control member 100 or 125 that corresponds to the boom which is not to be used is brought to its closed position (see FIG. 8 in respect of the member 100). The flow control member concerned, for example the flow control member 100, is effectively disconnected from the control arm 122 after first bringing said arm 122 to the position shown in FIG. 3 of the drawings in which the outlets 110 of both members 100 and 125 are closed. The locking pin 123 is then withdrawn to an ineffective position so that, subsequently, a manipulation of the arm 122 will be transmitted only to the flow control member 125, the member 100 remaining unaffected in its fully closed position. Until the pin 123 is re-engaged, adjustment of the arm 122 will only affect the position of the flow control member 125 with a view to ensuring that the correct amount of material per unit time flows through its outlets 110. Obviously, if desired, the pin 123 may remain engaged and the pin 126 be disengaged to render the boom 20 effective and the boom 19 ineffective. If the implement is to be used frequently on very uneven soil, it may be advantageous, to reduce the effect of the vibration that occurs during travel over such soil, to furnish the conveying members with conveyor belts whose effective surfaces are not plain surfaces. With such constructions, there is a marked reduction in displacement of the material laterally across the upper runs of the belts during bumpy progress over uneven land.

FIG. 20 illustrates a construction for a belt of one of the conveying members in which the surface thereof that is uppermost during passage through the upper run of the belt is provided at substantially regular intervals with V-shaped ridges 285 having points which are directed rearwardly with respect to the intended direction of operative travel 286 of the upper run of the belt. Each ridge 285 preferably has a height of substantially 2 millimeters and, in the event of a jolt occurring that displaces material on the belt relative thereto, the ridges 285 will tend to displace the material back towards a central region of the width of the belt. The ridges 285 tend to remove any material disposed against the upright rims or walls of the corresponding guide 56 back towards the center of the belt so that there is still not much frictional drag between the edges of the belt and the rims of the guide 56 that is attributable to material lodged therebetween. FIGS. 21 and 22 illustrate an alternative belt constuction in which the surface thereof that is uppermost when travelling through the upper run of the conveying member concerned is formed as a plurality of teeth 287 that are spaced apart from one another by regular short distances. The teeth 287 extend perpendicular to the length of the run of the belt in which they are disposed and their form can be seen in FIG. 22 of the drawings. It will be apparent from that Figure that each tooth 287 has a leading short portion, with respect to the direction 286, the plane of which is substantially perpendicular to that direction and a trailing longer portion 287A that is inclined to said direction 286 between the top or outer edge of one leading short portion and the bottom or inner edge of the next leading short portion.

FIG. 23 of the drawings illustrates a still further conveying member belt 289, said belt 289 having opposite upright rims 288 that project upwardly from the top surface of the belt, when the latter is in its upper run, by a distance 291 that preferably has a magnitude of substantially 6 millimeters. The opposite upright rims 288 are made from a very flexible material, such as foam rubber, said material being of significantly greater flexibility than that from which the belt 289 itself is made. If the rims 288 are formed from foam rubber, the belt 289 itself may be made from a strong synthetic plastics material that may conveniently, but not essentially, be reinforced by natural or synthetic textile fibers. It will be seen from FIG. 23 of the drawings that, in cross-section, the two rims 288 would together define a trapezium if it were not for the intervening space and, with such a construction, the outer surfaces of said rims 288 define, with the upright walls or rims of the corresponding guide 56, gaps 290 that are of upwardly opening divergent configuration. This is effective in preventing, or at least minimizing the sticking of material between the rims 288 and the walls or rims of the corresponding guide 56 because the high flexibility of each rim 288 allows any grain or the like of material that may find its way into one of the gaps 290 to be pushed back upwardly out of that gap to a location where it can fall back onto the upper surface of the belt 289 between the rims 288. Whatever construction is employed for the conveying member belts, it is noted that those belts which form parts of the conveying members 9 and 15 are of sufficient flexiblity to enable them to fold, without permanent deformation, when the outer portions of the booms 19 and 20 are turned about the axes defined by the corresponding shafts 51 relative to the inner portions of those booms either as the result of an impact against an obstacle or when the booms are deliberately folded up to bring them to their previously described inoperative transport positions. Under such circumstances, the belts merely curve around the shafts 51 and/or around parts that adjoin those shafts, and automatically regain their correct working positions when the operative positions of the booms 19 and 20 are re-established.

Although various features of the spreading implement have been described and are illustrated in the accompanying drawings which are set forth in the following claims as inventive features, it is emphasized that the invention is not necessarily limited to those features and includes within its scope each of the parts of the spreading implement which has been described or illustrated in the accompanying drawings, or both, individually and in various combinations.

What we claim is:

1. A spreading implement movable over the ground comprising a frame and a material container supported on said frame, at least two outlet ports adjacent the bottom of said container and conveying means being positioned below said container, said conveying means being mounted on an elongated spreading boom that is supported on said implement and said boom with said conveying means being positionable to extend laterally from said container with respect to the normal direction of movement of said implement, at least one rotatable spreading implement being mounted on an upwardly extending shaft adjacent the longitudinal center line of said conveying means, said conveyor means comprising at least two spaced apart conveyor members adapted to receive material from said ports and move same in the same direction along said boom, at least one guide member being located to bridge the space between said ports under said ports and above said conveying means, said guide member being positioned to direct material from said ports towards said conveying means, said guide member also being adapted to guide material from said ports into said conveyor members and away from said space between said conveyor members, and driving means connected to rotate said rotatable spreading implement and move said conveying means.

2. An implement as claimed in claim 1, wherein said conveying members each comprises a conveyor belt at least part of which is supported by a channel-shaped guide on said boom said guide member being mounted on top of upright walls of said guide and adjacent inner ends thereof.

3. An implement as claimed in claim 2, wherein said guide member is funnel shaped and comprises two strips that extend in the same general direction as an upper run of each said belt, said two strips extending in downwardly convergent relationship towards said upper run and being located adjacent the opposite edges of that run.

4. An implement as claimed in claim 3, wherein opposite upright walls of said channel-shaped guide are of substantially constant height and said two strips are inclined relative to said walls.

5. An implement as claimed in claim 3, wherein said guide member and a further similar guide member comprise a pair of guide members which extend at both sides of at least one of said ports of said container, when considered in plan view and also when considered in a direction parallel to the length of said conveying means.

6. An implement as claimed in claim 5, wherein said guide member extends outwardly from at least one of said ports, with respect to the direction of movement of said conveying means for a distance that at least equals the width of said one port when measured in the same direction.

7. An implement as claimed in claim 5, wherein each said guide member extends inwardly from each said port, for a distance that at least equals twice the width of said port when measured in the same direction, said pair of said guide members overlapping longitudinally along and above the corresponding said conveyor member, the distance between the guide members of each said pair of guide members being less than the width of said corresponding conveyor member.

8. An implement as claimed in claim 1, wherein said conveying members each includes a conveyor belt and a flow control member is provided which includes said ports, each said port comprising at least one outlet, said control member having a number of outlets equal to the number of conveying members that co-operate with said ports each said conveying member being positioned immediately below one said port, auxiliary outlets being provided in said control member, one of said auxiliary outlets corresponding to each of said conveyor belts.

9. An implement as claimed in claim 1, wherein, as seen in plan view, said container has a shape which is elongated in a direction that is substantially perpendicular to each direction of movement, said container having two outlet funnels that are located alongside one another in the direction in which the container is elongated, a partition dividing said container into two compartments, each compartment having a correspondng one of the two outlet funnels at the lower portion thereof.

10. An implement as claimed in claim 9, wherein the top of said container comprises a periphery which defines an opening and a flexible cover is attached to cover said top, said periphery substantially coinciding with the surface of a truncated pyramid, said cover overlapping said periphery substantially completely around said top.

11. An implement as claimed in claim 10, wherein one edge of said flexible cover is fastened to said container along one longer side thereof by a shaft, elastic stretchers and hooks releaseably connecting said cover to overlap said periphery at the other sides of said container.

12. An implement as claimed in claim 1, wherein said frame comprises a front beam located substantially at the front of the implement with respect to the direction of travel, said beam having two spaced inboard substantially vertical beams connected thereto.

13. An implement as claimed in claim 12, wherein, with respect to the direction of travel, said frame comprises a rear beam located at the rear of said container and first portions of two connecting frame beams extending away from said rear beam in substantially vertical directions, said connecting frame beams having forwardly diverging second portions that are substantially horizontally disposed, adjacent the lower portion of said frame and secured to said vertical beams.

14. An implement as claimed in claim 13, wherein at least one substantially horizontal beam extends between each said vertical beam and the first portion of each said corresponding connecting frame beam, each said horizontal beam being located at a level about midway between the tops and bottoms of the vertical beams and being interconnected by a further substantially horizontal beam that is substantially perpendicular to the direction of travel.

15. An implement as claimed in claim 1, wherein each said conveying member includes an endless belt and the upper effective run of each said belt is positioned in a corresponding guide means of substantially channel-shaped cross-section, said guide means having upright walls alongside both edges of the belt, a maximum clearance of substantially 2 millimeters being provided between each said belt edge and the corresponding wall of said guide means.

16. An implement as claimed in claim 15, wherein each belt moves substantially horizontally and has a non-smooth profiled surface.

17. An implement as claimed in claim 16, wherein said surface comprises a plurality of ridges that have heights of about 2 millimeters.

18. An implement as claimed in claim 17, wherein said ridges extend substantially perpendicular to the direction of movement of the belt.

19. An implement as claimed in claim 18, wherein, as seen in side elevation, said ridges have leading short sides, with respect to said direction of belt movement, and trailing long sides which slope downwardly and rearwardly from the upper edges of the leading short sides towards the lower edges of the succeeding short sides.

20. An implement as claimed in claim 17, wherein said surface comprises a plurality of substantially V-shaped ridges with points directed rearwardly with respect to the direction of movement of the belt.

21. An implement as claimed in claim 15, wherein each belt comprises a conveyor belt having upright rims along its edges.

22. An implement as claimed in claim 21, wherein said upright rims are made of material more resilient than said conveyor belt material.

23. An implement as claimed in claim 15, wherein each belt has adjoining ends interconnected by a flat belt binder which is attached above and below each said adjoining end and defines interrupted loops across the edge of each of said end, said loops of one said binders received between the loops of the other of said binders, a hinge pin received through said engaging loops connecting same whereby said ends are connected in a substantially uniplanar manner.

24. An implement as claimed in claim 15, wherein each belt passes around a roller of said driving means and said roller has an outer curved surface of a substantially compressible resilient material.

25. An implement as claimed in claim 24, wherein each belt extends to a corresponding spreading implement and an outer roller around which that belt passes is mounted on a supporting member, said supporting member comprising a substantially channel-shaped member opened on the bottom clamped over an end of a corresponding channel-shaped guide opened on the top, said belt received between said channel-shaped member and said channel shaped guide.

26. An implement as claimed in claim 1, wherein said conveying means comprises a plurality of conveyor belts and said boom has elongated lower belt supports for the return run of said belts, said belt supports comprising plates having downwardly bent-over extremities, said belt supports being connected on only one side of said boom.

27. An implement as claimed in claim 26, wherein at least one said belt support is a substantially horizontally disposed end of a strip that interconnects two beams of said boom.

28. An implement as claimed in claim 1, wherein said boom comprises two portions of substantially the same length that are turnable relative to one another about a substantially vertical pivot axis, said pivot axis being located adjacent the front of said boom with respect to the normal direction of travel whereby said boom portion farthest from said container is pivotable in the usual direction of travel of the implement.

29. An implement as claimed in claim 1, wherein each said conveying member includes an endless belt of a different relative length than the other said conveying members and said boom is pivoted to said frame and turnable about a substantially vertical pivot located at the rear of said boom with respect to the direction of travel, at least one of said endless belts extending along said turnable boom outboard of said vertical pivot.

30. An implement as claimed in claim 29, wherein a closed belt bracket is located adjacent said pivot, said closed belt bracket covering at least two of said endless belts.

31. An implement as claimed in claim 30, wherein said closed bracket is located adjacent and laterally outboard said pivot.

32. An implement as claimed in claim 31, wherein said closed bracket comprises a horizontal portion that is located below a channel-shaped guide for at least one conveyor belt, said bracket having a downwardly inclined portion that extends away from the horizontal portion.

33. An implement as claimed in claim 29, wherein said boom comprises spaced apart beams that extend substantially parallel to the length of at least one conveyor belt, said spaced apart beams being spaced above that conveyor belt and also located, when the implement is viewed in plan, at opposite sides of that conveyor belt.

34. An implement as claimed in claim 33, wherein the outer portions of said spaced apart beams are inclined outwardly and forwardly by several degrees.

35. An implement as claimed in claim 33, wherein a rotatable spreading member is located adjacent an outer delivery end of the longest conveyor belt and the latter is located substantially midway between the outer extremities of the spaced apart beams.

36. An implement as claimed in claim 33, wherein each said conveyor belt leads to a corresponding rotatable spreading implement and a flexible cover is secured to the spaced apart beams above the conveyor belts.

37. An implement as claimed in claim 36, wherein said cover extends throughout substantially the entire length of the boom.

38. An implement as claimed in claim 29, wherein a cover member comprised of a flexible material maintained in tension overlies a channel-shaped guide for at least one conveyor belt of said conveying means at the outer portion of said boom.

39. An implement as claimed in claim 38, wherein said channel-shaped guide is covered for substantially its entire length by said cover member.

40. An implement as claimed in claim 39, wherein said cover member is secured to said guide by resilient clips that extend across the top of that guide, resilient limbs extending from said clips which engage below the bottom of said guide.

41. A spreading implement movable over the ground comprising a frame and a material container supported on said frame, at least one outlet port adjacent the bottom of said container and conveying means being positioned below said container, a movable control member including an opening for selective registration with said outlet port resiliently supported between the bottom of said container and said conveying means, leaf springs providing said resilient support for said control member, said leaf springs carried by said container, said conveying means comprising an elongated boom with beam means extending laterally from each side of said container during operation, a plurality of conveyor belts being supported on guide means that extend substantially parallel to said beam means and said boom being pivoted to said frame, said conveyor belts having different lengths and terminating with delivery ends at spaced apart locations laterally of the container with respect to the normal direction of travel of said implement, spreading means being positioned adjacent said delivery ends, whereby material can be spread over a broad path during operation, each boom having supplemental support means that interconnects each laterally extending boom with said implement.

42. An implement as claimed in claim 41, wherein said supplemental support means includes a flexible member that extends from the top of said container to an anchor located intermediate the ends of each boom.

43. An implement as claimed in claim 42, wherein the flexible member is connected to a fastening member located at the front of said container top and above a corresponding pivot connection between each boom and frame, said connection being turnable about a substantially vertical axis, said fastening member being positioned in front of said conveying belts of the respective boom.

44. An implement as claimed in claim 41, wherein said container is provided with two funnels, said outlet port being disposed adjacent to the bottom of one of said funnels and a further outlet port being disposed adjacent the other of said funnels, a further movable controlled member being provided below said further outlet port.

45. A spreading implement movable over the ground comprising a frame and a material container supported on said frame, at least two outlet ports adjacent the bottom of said container and conveying means being positioned below said container, said conveying means being mounted on an elongated spreading boom that is supported on said implement and said boom with said conveying means being positionable to extend laterally from said container with respect to the normal direction of movement of said implement, at least one rotatable spreading implement being mounted on an upwardly extending shaft adjacent the longitudinal center line of said conveying means, said conveying means comprising at least two spaced apart conveyor members adapted to receive material from said ports and to move same in the same direction along said boom, at least one guide member being located between said ports and said conveying means, said guide member being positioned to direct material from said ports towards said conveying means, driving means being provided connected to rotate said rotatable spreading implement and move said conveying means, said conveying members each including a conveyor belt, a flow control member is provided which includes said ports, each said port comprising at least one outlet, said control member having a number of outlets equal to the number of conveying members that cooperate with said ports, each said conveying member being positioned immediately below one said port, and auxiliary outlets being provided in said control member, one of said auxiliary outlets corresponding to each of said conveyor belts.

46. An implement as claimed in claim 45, wherein considered in a direction parallel to the length of each conveyor belt, at least one of said auxiliary outlets is located at each side of said first mentioned outlets.

47. An implement as claimed in claim 46, wherein said flow control member is displaceably mounted on said implement and each first mentioned outlet has at least one auxiliary outlet in line therewith in the direction in which said flow control member is displaceable.

48. An implement as claimed in claim 45, wherein said flow control member is slideable on supporting members positioned adjacent said port and resilient means is provided which engages said flow control member and urges same into contact with edges of said port.

49. An implement as claimed in claim 48, wherein said container has two sections and each section has a respective outlet with a corresponding said flow control member, the two flow control members being connected to a single control arm.

50. An implement as claimed in claim 49, wherein each said flow control member is connected by a corresponding rod to a corresponding coupling arm that is turnable about the axis of a corresponding shaft and the latter is connected so as to be pivoted to said frame, fixing means for connecting each coupling arm to a corresponding pivotal arm, and wherein each said pivotal arm is connected to only one corresponding said control arm.

51. An implement as claimed in claim 50, wherein each said fixing means is a spring-loaded locking pin and each of said locking pins are mounted on corresponding pivotal arms with tips thereof releaseably entered into holes in the corresponding coupling arms, whereby said coupling arms can be selectively fixed to or disconnected from said control arm.

52. A spreading implement movable over the ground comprising a frame and a material container supported on said frame, at least one outlet port adjacent the bottom of said container and conveying means being positioned below said container, said conveying means being mounted on an elongated spreading boom that is supported on said implement and said boom with such conveying means being positionable to extend laterally from said container with respect to the normal direction of movement of said implement, at least one rotatable spreading implement being mounted on an upwardly extending shaft adjacent the longitudinal center line of said conveying means, at least one guide member being located between said port and said conveying means, said guide member being positioned to direct material from said port towards said conveying means, driving means connected to rotate said rotatable spreading implement and move said conveying means, said frame comprising a front beam located substantially at the front of the implement with respect to the direction of travel, said front beam having two substantially vertical beams connected thereto, said frame comprising, with respect to the direction of travel, a rear beam located at the rear of said container and first portions of two connecting frame beams extending away from said rear beam in substantially vertical directions, said connecting frame beams having second portions that are substantially horiziontally disposed adjacent the lower portion of said frame and secured to said vertical beams, at least one substantially horizontal beam extending between each said vertical beam and the first portion of each said corresponding frame connecting beam, each said horizontal beam being located at a level about midway between the tops and bottoms of said vertical beams and being interconnected by a further substantially horizontal beam that is substantially perpendicular to the direction of travel.

53. An implement as claimed in claim 52, wherein said frame includes at least one substantially vertical supporting beam interconnecting said boom with the frame, said supporting beam being turnable about a substantially vertical axis.

54. An implement as claimed in claim 53, wherein said first mentioned horizontal beams and the second horizontal portions of the connecting beams have lugs that project outwardly from said frame, two of said substantially vertical supporting beams being turnably mounted between said lugs at opposite sides of said frame.

55. An implement as claimed in claim 54, wherein each said vertical supporting beam has a corresponding substantially horizontal supporting arm secured to it, each supporting arm comprising two substantially perpendicularly interconnected portions that are coupled to the corresponding supporting beam by struts, said struts being secured to the top of each supporting beam and comprising substantially horizontal lugs to which are connected the ends of two supporting arms that are inclined towards one another, the opposite ends of the arms having a first support that co-operates with a further support carried at the end of said corresponding arms, said boom being mounted between said first support and further support to be turnable about a substantially horizontal axis.

56. An implement as claimed in claim 55, wherein said first support has a spring-loaded latch that retains that support in a chosen position with respect to said frame about the corresponding substantially vertical axis.

57. An implement as claimed in claim 56, wherein said first support has a retaining lug and said spreading boom is retainable in a transport position relative to said frame in which position said boom is turned angularly about 90° around a vertical axis with respect to the lateral operative position of said boom.

58. An implement as claimed in claim 55, wherein the substantially horizontal axis about which said boom is turnable extends substantially perpendicular to the length of said conveying means.

59. An implement as claimed in claim 58, wherein the supporting beam for said boom has pins at its opposite ends and said pins are turnably journalled in supports on the substantially horizontal supporting arm, end regions of said supporting beam having supporting strips that extend towards the side of the supporting beam at which the corresponding substantially vertical beam is located, at least one driving roller for a belt of the conveying means extending between said supporting strips.

60. An implement as claimed in claim 59, wherein a plurality of driving rollers are united to form a cylindrical driving roller secured to a shaft and a pulley is mounted on one end of said shaft, said pulley being in driven connection with a further pulley on a main driving shaft through the intermediary of a transmission belt of substantially circular cross-section.

61. An implement as claimed in claim 60, wherein said main driving shaft has an end in driven connection with a power take-off shaft of a tractor.

62. An implement as claimed in claim 51, wherein said conveying means has at least one driving roller and at least one conveyor belt of resilient material is mounted on that roller.

63. An implement as claimed in claim 61, wherein said cylindrical driving roller has an outer curved surface of resilient material.

64. A spreading implement movable over the ground comprising a frame and a material container supported on said frame, at least one outlet port adjacent the bottom of said container and conveying means being positioned below said container, said conveying means being mounted on an elongated spreading boom that is supported on said implement and said boom together with said conveying means being positionable to extend laterally from said container with respect to the normal direction of movement of said implement, at least one rotatable spreading implement being mounted on an upwardly extending shaft adjacent the longitudinal center line of said conveying means, at least one guide member being located between said port and said conveying means, said guide member being positioned to direct material from said port towards said conveying means, driving means connected to rotate said rotatable spreading implement and move said conveying means, said conveying means including a conveying belt and said driving means including a driving roller, said spreading boom having a guide for a lower return of said conveyor belt, said guide being located adjacent said driving roller of said driving means.

65. An implement as claimed in claim 64, wherein said guide has a substantially inverted channel-shaped cross-section.

66. A spreading implement movable over the ground comprising a frame and a material container supported on said frame, at least one outlet port adjacent the bottom of said container and conveying means being positioned below said container, said conveying means being mounted on an elongated spreading boom that is supported on said implement and said boom with said conveying means being positionable to extend laterally from said container with respect to the normal direction of movement of said implement, at least one rotatable spreading implement being mounted on an upwardly extending shaft adjacent the longitudinal center line of said conveying means, at least one guide member being located between said port and said conveying means, said guide member being positioned to direct material from said port towards said conveying means, driving means connected to rotate said rotatable spreading implement and move said conveying means, said conveying means including a plurality of endless belts, the upper effective run of each said belt being positioned in a corresponding guide means of substantially channel-shaped cross-section, said guide means having upright walls along both edges of its corresponding said belt, a maximum clearance of substantially two millimeters being provided between each said belt edge and the corresponding wall of said guide means, each said belt passing around a roller of said driving means, said roller having an outer curved surface of resilient material, each said belt extending to a corresponding said rotatable spreading implement and an outer roller around which that belt passes being mounted on a supporting member, said supporting member comprising a substantially channel-shaped member clamped to an end of a corresponding channel-shaped guide, the limbs of said channel-shaped member extending upwardly from its base and a clamping member being positioned between the upper edges of those limbs for securing that member to the upper edges of the limbs of said guide.

67. An implement as claimed in claim 66, wherein a hood-shaped guide extends between the delivery end of each belt and the corresponding rotatable spreading implement, said spreading member being a disc with blades and the outer end of the hood-shaped guide being located radially inwardly from the ends of said blades.

68. An implement as claimed in claim 67, wherein said rotatable spreading implement has 12 spreading blades.

69. A spreading implement movable over the ground comprising a frame and a material container supported on said frame, at least one outlet port adjacent the bottom of said container and conveying means being positionable below said container, said conveying means comprising an elongated boom with beam means extending laterally from each side of said container during operation, a plurality of conveyor belts being supported on guide means that extend substantially parallel to said beam means and said boom being pivoted to said frame, said conveyor belts having different lengths and terminating with delivery ends at spaced apart locations laterally of the container with respect to the normal direction of travel of said implement, spreading means being positioned adjacent said delivery ends, whereby material can be spread over a broad path during operation, said boom having supplemental support means that interconnects each laterally extending boom with said implement, said supplemental support means including a flexible member that extends from the top of said container to an anchor located intermediate the ends of each said boom, said flexible member being connected to a fastening member located at the front of said container top and above a corresponding pivot connection between each said boom and said frame, said connection being turnable about a substantially vertical axes, said fastening member being positioned in front of said conveying belt of the respective said boom, said fastening member being located nearer to a vertical plane of substantial symmetry of the implement that extends parallel to its direction of travel than is the substantially vertical axis about which said boom is turnable.

70. An implement as claimed in claim 69, wherein the container top has a stop against which said flexible member bears.

71. A spreading implement movable over the ground comprising a frame and a material container supported on said frame, at least one outlet port adjacent the bottom of said container and conveying means being positioned below said container, said conveying means comprising an elongated boom with beam means extending laterally from each side of said container during operation, a plurality of conveyor belts being supported on guide means that extend substantially parallel to said beam means and said boom being pivoted about horizontal pivot means relative to said frame, said conveyor belts having different lengths and terminating with delivery ends at spaced apart locations laterally of the container with respect to the normal direction of travel of said implement, spreading means being positioned adjacent said delivery ends, whereby material can be spread over a broad path during operation, each said boom having supplemental support means that interconnects each laterally extending boom with said implement, an outer support end portion of said boom having a ground engaging support, said ground engaging support extending for substantially the entire width of said boom, said ground engaging support and said horizontal pivot means adapted to maintain said boom at a disposition which is substantially parallel to the underlying ground.

72. A spreading implement movable over the ground comprising a frame and a material container supported on said frame, at least one outlet port adjacent the bottom of said container and conveying means being positioned below said container, said conveying means comprising an elongated boom with beam means extending laterally from each side of said container during operation, a plurality of conveyor belts being supported on guide means that extend substantially parallel to said beam means and said boom being pivoted to said frame, said conveyor belts having different lengths and terminating with delivery ends at spaced apart locations laterally of the container with respect to the normal direction of travel of said implement, spreading means being positioned adjacent said delivery ends, whereby material can be spread over a broad path during operation, each boom having supplemental support means that interconnects each laterally extending boom with said implement, a ground support provided on an outer end portion of said boom, said ground support extending for substantially the entire width of said boom, said ground support having a substantially horizontal ground engaging part and an upwardly inclined part secured to a beam of said beam means which part is located at one side of at least one conveyor belt and an oppositely upwardly inclined part that is secured to a further beam of said beam means at the other side of said conveying belt.

73. An implement as claimed in claim 72, wherein a leg is pivoted to said ground support to support the boom from the ground when said boom is in an inoperative position.

74. An implement as claimed in claim 73, wherein said leg has a strip-shaped end that is located between two lugs fastened to said ground support, said end being formed with a slot and a pin extending between said lugs and slot.

75. A spreading implement movable over the ground comprising a frame and a material container supported on said frame, at least one outlet port adjacent the bottom of said container and conveying means being positioned below said container, said conveying means comprising an elongated boom with beam means extending laterally from each side of said container during operation, a plurality of conveyor belts being supported on said guide means that extend substantially parallel to said beam means and said boom being pivoted to said frame, said conveyor belts having different lengths and terminating with delivery ends at spaced apart locations laterally of the container with respect to the normal direction of travel of said implement, spreading means being positioned adjacent said delivery ends, whereby material can be spread over a broad path during operation, said boom having supplemental support means that interconnects each said laterally extending boom with said implement, the outer end of said boom having an arm with a ground marker, said arm being turnably connected to a supporting bracket on said boom and extending to both sides of the axis about which said arm is turnable.

76. An implement as claimed in claim 75, wherein said bracket supports the marker arm when that arm is located at either side of the axis about which it is turnable, said bracket comprising a lug which extends along the arm during operation.

77. An implement as claimed in claim 76, wherein said boom comprises inner and outer portions that are connected to one another by a substantially vertical shaft and said bracket having a fastening lug that retains the boom in an inoperative position when the inner and outer boom portions are folded to a transport position about said shaft.

78. An implement as claimed in claim 77, wherein, when said boom is folded into its transport position, said fastening lug fits between upper and lower spaced lugs on the inner portion of the boom, said fastening lug and said spaced lugs having openings that receive a locking pin to retain the boom in its folded condition.

79. A spreading implement movable over the ground comprising a frame and a material container supported on said frame, conveying means being positioned below such container, said conveying means being mounted on an elongated spreading boom that is supported on said implement and said boom with said conveying means being positionable to extend laterally from said container with respect to the normal direction of movement of said implement, at least one rotatable spreading member being mounted adjacent the longitudinal center line of said conveying means, driving means connected to rotate said spreading member and move said conveying means, said frame comprising a front beam located substantially at the front of the implement with respect to the direction of travel, said front beam having two substantially vertical beams spaced inboard of said front beam and connected thereto, said frame further comprising a rear beam, with respect to the direction of travel, located at the rear of said container, two connecting frame beams each having first and second portions, said first portions of said connecting frame beams extending away from said rear beam in substantially vertical directions, said second portions of said connecting frame beams being forwardly diverging and substantially horizontally disposed adjacent the lower portion of said frame and secured to said vertical beams.

* * * * *